United States Patent
Yoshikawa et al.

(10) Patent No.: US 9,231,730 B2
(45) Date of Patent: Jan. 5, 2016

(54) RADIO COMMUNICATION DEVICE

(75) Inventors: Yoshishige Yoshikawa, Shiga (JP); Koichi Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 414 days.

(21) Appl. No.: 13/823,428

(22) PCT Filed: Sep. 2, 2011

(86) PCT No.: PCT/JP2011/004930
§ 371 (c)(1), (2), (4) Date: Mar. 14, 2013

(87) PCT Pub. No.: WO2012/042748
PCT Pub. Date: Apr. 5, 2012

(65) Prior Publication Data
US 2013/0170530 A1    Jul. 4, 2013

(30) Foreign Application Priority Data
Sep. 30, 2010 (JP) ................................. 2010-221148

(51) Int. Cl.
*H04L 1/00* (2006.01)
*H04B 7/06* (2006.01)
*H04B 7/08* (2006.01)

(52) U.S. Cl.
CPC ............ *H04L 1/0036* (2013.01); *H04B 7/0682* (2013.01); *H04B 7/084* (2013.01)

(58) Field of Classification Search
CPC ........ H01Q 3/267; H01Q 3/40; H03F 1/3282; H03L 7/00; H04L 1/0036; H04B 7/084; H04B 7/0682

USPC .......................................................... 375/315
See application file for complete search history.

(56) References Cited

U.S. PATENT DOCUMENTS

| | | | | |
|---|---|---|---|---|
| 4,268,829 A | * | 5/1981 | Baurle et al. ......... | H01Q 3/2635 342/368 |
| 6,400,318 B1 | * | 6/2002 | Kasami et al. ....... | H01Q 3/2605 342/372 |

(Continued)

FOREIGN PATENT DOCUMENTS

| CN | 1233122 A | 10/1999 |
|---|---|---|
| JP | 59-006536 B | 2/1984 |

(Continued)

OTHER PUBLICATIONS

Office Action and Search Report, and partial English language translation thereof, in corresponding Chinese Application No. 201180047513.2, dated Jan. 23, 2015, 11 pages.

(Continued)

*Primary Examiner* — Vineeta Panwalkar
(74) *Attorney, Agent, or Firm* — Brinks Gilson & Lione

(57) ABSTRACT

A radio communication device includes a first antenna, a second antenna, a phase varying section that varies a phase of a first RF signal received by or transmitted from the first antenna, and a phase control section that causes the phase varying section to vary a phase amount, which is a varied amount of the phase of the first RF signal received by or transmitted from the first antenna. Thus, it is possible to prevent the size of a device configuration from increasing and avoid the lowering of a reception electric field level in a localized area.

6 Claims, 22 Drawing Sheets

1  First antenna
2  Second antenna
3  Phase varying section
4  Synthesizing section
5  Phase control section
6  Transmission/reception section
7  First RF signal
8  Second RF signal
9  Third RF signal

(56) References Cited

U.S. PATENT DOCUMENTS

| | | |
|---|---|---|
| 6,748,036 B1 | 6/2004 | Tsurumaru |
| 2008/0031375 A1 | 2/2008 | Zhou et al. |
| 2008/0063116 A1 | 3/2008 | Yokoyama |
| 2009/0185577 A1 | 7/2009 | Kishiyama et al. |
| 2009/0315774 A1* | 12/2009 | Son et al. ............... 342/372 |
| 2010/0134085 A1 | 6/2010 | Nishida |
| 2010/0189204 A1* | 7/2010 | Morris et al. ............ 375/347 |

FOREIGN PATENT DOCUMENTS

| | | |
|---|---|---|
| JP | 04-304036 A | 10/1992 |
| JP | 05-284435 A | 10/1993 |
| JP | 06-310997 A | 11/1994 |
| JP | 08-008633 A | 1/1996 |
| JP | 2002-152171 A | 5/2002 |
| JP | 2006-148446 A | 6/2006 |
| JP | 2006-238222 A | 9/2006 |
| JP | 2007-116339 A | 5/2007 |
| JP | 2008-060913 A | 3/2008 |
| JP | 2008-252390 A | 10/2008 |
| JP | 2009-273183 A | 11/2009 |
| JP | 2010-136497 A | 6/2010 |
| WO | WO 2006/103758 A1 | 10/2006 |

OTHER PUBLICATIONS

International Search Report for International Application No. PCT/JP2011/004930, dated Oct. 25, 2011, 4 pages.

\* cited by examiner

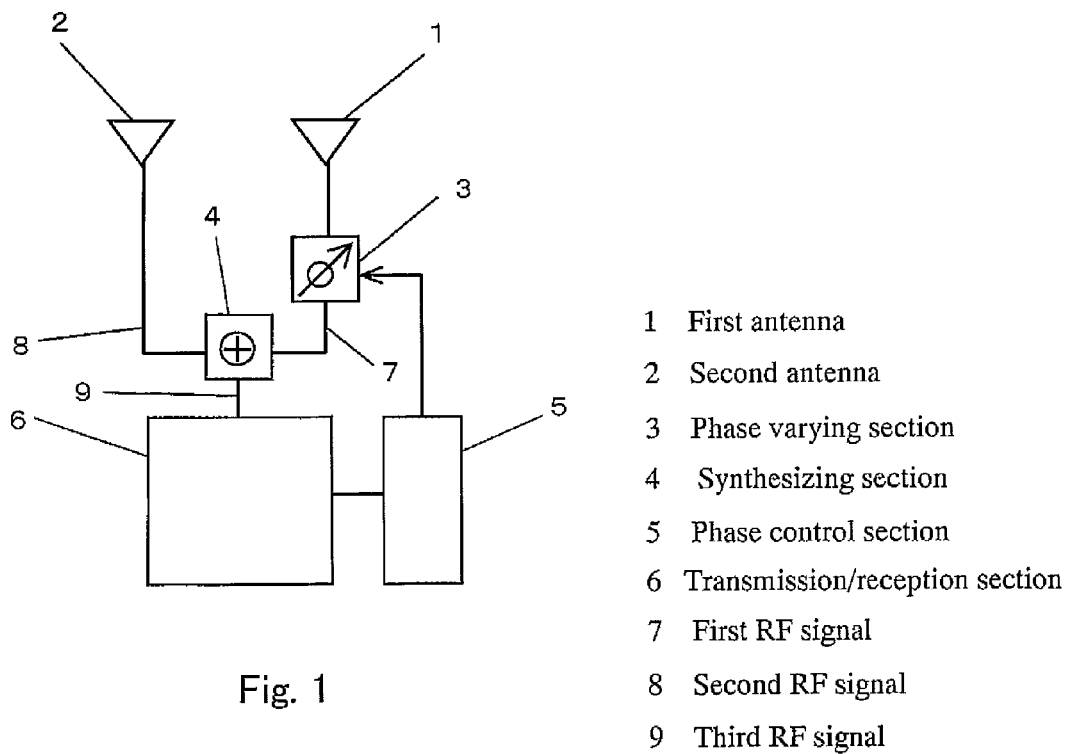

Fig. 1

1 First antenna
2 Second antenna
3 Phase varying section
4 Synthesizing section
5 Phase control section
6 Transmission/reception section
7 First RF signal
8 Second RF signal
9 Third RF signal

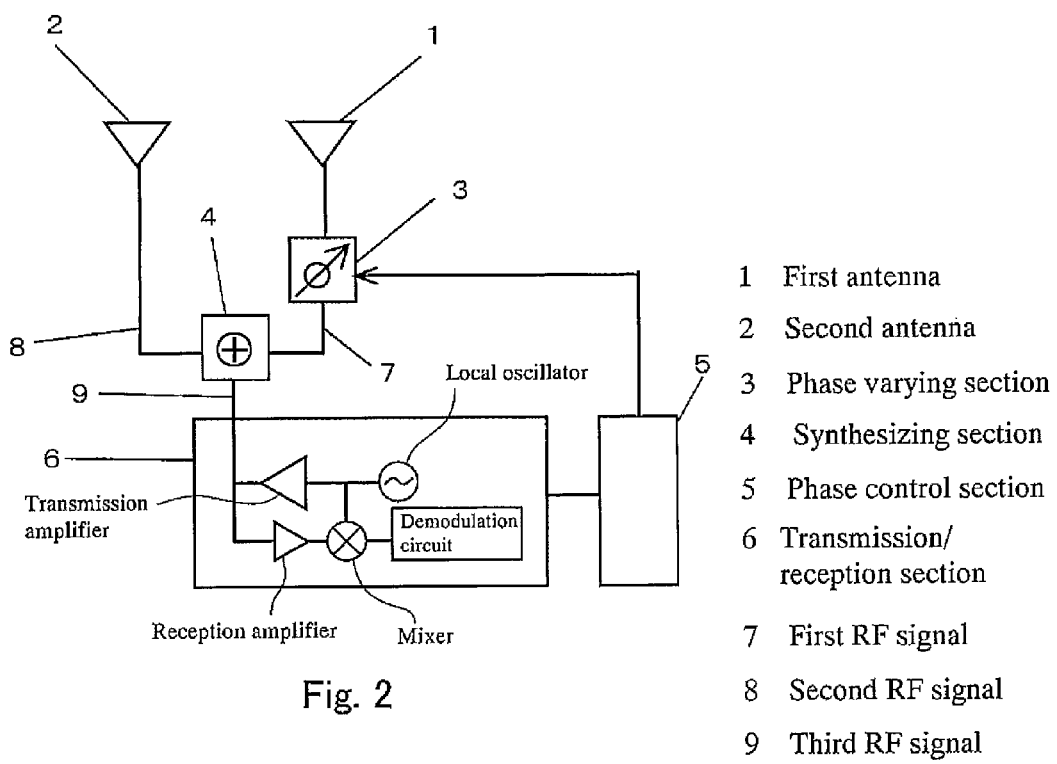

Fig. 2

1 First antenna
2 Second antenna
3 Phase varying section
4 Synthesizing section
5 Phase control section
6 Transmission/reception section
7 First RF signal
8 Second RF signal
9 Third RF signal 11  Demodulation section
12  Error detection section

| Packet number | Data number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | |
| 1 | O | O | O | × | × | O | O | O | O | × | × | × | |
| 2 | × | O | O | O | × | O | O | O | O | O | × | × | |
| 3 | O | O | O | O | O | O | O | × | × | O | O | O | ← Transmit response indicating Completion of reception |
| 4 | | | | | | | | | | | | | |
| 5 | | | | | | | | | | | | | |
| 6 | O | O | O | O | O | O | O | O | O | O | O | O | After re-configuration of data |

Fig. 17

14 Received data re-configuring section

13 Received data re-configuring section
14 Reception level detection section

1   First antenna
2   Second antenna
3   Phase varying section
4   Synthesizing section
5   Phase control section
6   Transmission/reception section
7   First RF signal
8   Second RF signal
9   Third RF signal
15  Filter

| | |
|---|---|
| 1 | First antenna |
| 2 | Second antenna |
| 6 | Transmission/reception section |
| 7 | First RF signal |
| 8 | Second RF signal |
| 9 | Third RF signal |
| 21 | Variable dividing section |
| 22 | Dividing ratio control section |

RADIO COMMUNICATION DEVICE

This application is a 371 application of PCT/JP2011/004930 having an international filing date of Sep. 2, 2011, which claims priority to JP2010-221148 filed Sep. 30, 2010, the entire contents of which are incorporated herein by reference

TECHNICAL FIELD

The present invention relates to a radio (wireless) communication device which performs radio communication via radio (electric) waves. Particularly, the present invention relates to communication performed between radio communication devices in fixed positions in an environment in which there are many multi-paths of radio wave propagation, for example, communication performed between a radio communication device incorporated into a home electric appliance located within a building and an access point located in another room within the building, and communication performed between a smart meter located within a building and an access point attached to an outdoor electric pole.

BACKGROUND ART

A radio (wireless) band of Sub-GHz band including 900 MHz band or 2.4 GHz band can provide inexpensive radio communication devices which perform radio communication in which relatively wide areas can be covered. For this reason, it has been studied that radio communication devices capable of performing radio communication in the radio band of Sub-GHz band or 2.4 GHz band are incorporated into apparatuses or equipment.

For example, it is considered that such radio communication devices are incorporated into home electric appliances such as air conditioners and laundry machines for household use and thereby home networks are constructed, to provide advantages such as power saving, improved convenience, monitoring of failures, etc. In the electric home appliance home networks, communication can be performed between each electric home appliance and an access point attached in the vicinity of a pull-in position of Internet.

In recent years, attention has been paid to a smart meter which attains a higher function by adding a communication function to an electric power meter, a gas meter, a tap water meter, etc. Using the smart meter, communication can be performed between a radio communication device attached to a meter at home and an access point provided outdoors, for example, on an electric pole or on a building.

In systems such as the above stated home electric appliance home network, there is a problem that each radio communication device is provided in a fixed position and cannot be transported easily, or a radio wave propagation path becomes a multi-path environment due to presence of many obstacles such as walls or floors, and a reception level significantly degrades in a localized area due to fading (see FIG. 31). The reception level is a value decided based on an intensity (electric field intensity) of a radio wave signal (RF signal) being received. Whether or not the reception level is good is decided on the basis of a reception sensitivity, i.e., a minimum radio wave intensity required to ensure a reception quality necessary for the communication.

FIG. 31 shows a transmitter provided in a multi-path environment and a fluctuation (change) in a reception electric field level in a receiver provided (on a circumference) at an equal distance from the transmitter.

The reception level is significantly different depending on a location in the case where the receiver is provided on the location (localized area) on the circumference at an equal distance from the transmitter. This is due to the fact that a so-called fading phenomenon occurs, in which electric field levels are cancelled from each other or summed up, due to multi-paths of the radio waves. As can be seen from a cumulative probability distribution graph in FIG. 32, there exist an area in which the reception level is lower than a median value of the reception level by 8 dB or higher occupies 10% of the total, and an area in which the reception level is lower than the median value of the reception level by 18 dB or higher occupies 1% of the total.

For example, in the case of a radio (wireless) terminal used in mobile communication, such as a cellular phone, a communication environment changes as it moves. Therefore, a possibility that its reception level continues to be lowered in a localized area for a long period of time is low.

By comparison, the radio communication device incorporated into an electric home appliance or a radio communication device attached to a meter does not move, and therefore, its communication environment changes less. Therefore, there is a possibility that the reception level continues to be low for a long period of time. In this case, if the radio communication device fails to receive a communication packet, restoration from a discommunication state is difficult even though the communication packet is re-transmitted (transmitted subsequently). This must be addressed by using a diversity antenna.

Regarding the diversity antenna, there are a selective diversity method in which an antenna with a better reception level is selected from two antennas and a maximum ratio composition diversity method in which signals received by two antennas are input to two demodulation circuits, respectively, and two demodulated signals are composited optimally such that their phases conform to each other and their amplitudes conform to each other (e.g., see Patent Literatures 1~5).

Typically, in the case of using the selective diversity method, the lowering of the reception level of the cumulative probability 1% in a location can be improved by about 5 dB.

Patent Literature 1: Japanese Laid-Open Patent Application Publication No. Hei. 4-304036
Patent Literature 2: Japanese Laid-Open Patent Application Publication No. Hei. 5-284435
Patent Literature 3: Japanese Laid-Open Patent Application Publication No. Hei 8-8633
Patent Literature 4: Japanese Examined Patent Application Publication No. Sho. 59-6536
Patent Literature 5: International Publication No. 2006/103758

SUMMARY OF THE INVENTION

Technical Problem

However, in the selective diversity method, there exist problems, namely (1) that although two or a plurality of antennas are used, only the selected antenna is used after selecting the antenna, and therefore, an antenna gain is the same as that in a case where the diversity configuration is not used, and a problem (2) that reception levels of the two antennas are lowered with a certain probability and lowering of the reception level cannot be avoided satisfactorily.

In the maximum ratio composition method, there are a problem (3) that since a plurality of reception/demodulation circuits are required according to the number of the antennas, cost and electric power consumption are high, and a problem (4) that since it is necessary to provide the diversity antenna at a reception side, each of radio communication devices must include a plurality of antennas and a plurality of demodulation circuits in bidirectional communication.

The present invention has been developed in view of the above described problems, and an object of the present invention is to implement a radio communication device that can avoid lowering of a reception electric field level in a localized area, while preventing an increase in the size of the device.

Solution to Problems

To achieve the above described object, the radio communication device of the present invention comprises a first antenna; a second antenna; a phase varying means which varies a phase of a RF (radio frequency) signal received by or transmitted from the first antenna; and a phase control means which causes the phase varying means to vary a phase amount which is a varied amount of the phase of the RF signal received by or transmitted from the first antenna.

The phase amount is a varied amount of the phase of the RF signal received by the first antenna such that a relative phase difference between the RF signal received by the first antenna and the RF signal received by the second antenna is variable.

In accordance with the above described configuration, the phase varying means and the phase control means allow the relative phase difference between the RF signal received by the first antenna and the RF signal received by the second antenna to be variable in transmission or reception.

That is, the radio communication device of the present invention is able to vary the phase so that the cancellation of electric field levels due to fading occurring under a multi-path environment will not occur. Thus, the radio communication device of the present invention is able to avoid that the reception electric field level is lowered in a localized area.

Although the radio communication device of the present invention includes two antennas, one demodulation circuit associated with the reception is sufficient. In contrast, for example, in a case where two antennas are provided, in the configuration for implementing the conventional maximum ratio composition diversity method, two demodulation circuits associated with the reception are needed. That is, although in the conventional maximum ratio composition diversity method, it is necessary to provide demodulation circuits associated with the reception which are equal in number to the antennas, one demodulation circuit associated with the reception is sufficient, irrespective of the number of antennas in the present application. Thus, it is possible to avoid that a size of a device configuration increases.

Therefore, the radio communication device of the present invention is able to achieve advantages that it is possible to avoid that a size of the device configuration increases and the reception level is lowered in a localized area.

To achieve the above described object, a radio communication device of the present invention comprises a first antenna, a second antenna, and a dividing ratio control means which changes a dividing ratio between the electric power of the RF signal received by or transmitted from the first antenna and the electric power of the RF signal received by or transmitted from the second antenna.

In accordance with this configuration, the dividing ratio control means is able to vary a relative electric power difference between the RF signal received by the first antenna and the RF signal received by the second antenna in transmission or reception.

By varying the dividing ratio of the electric power between the RF signal received by the first antenna and the RF signal received by the second antenna 2, a result of a sum of the RF signals received by these antennas can be changed, thereby mitigating cancellation of the radio waves due to fading. That is, it is possible to avoid that the reception level is lowered significantly. Or, by varying the dividing ratio between the electric power supplied to the first antenna and the electric power supplied to the second antenna in transmission, a radiation directivity characteristic from the two antennas can be changed, and as a result, it is possible to form a state in which cancellation of reception intensities due to multi-paths does not occur, at the reception side.

Although the radio communication device of the present invention includes two antennas, one demodulation circuit associated with the reception is sufficient. In contrast, for example, in a case where two antennas are provided, in the configuration for implementing the conventional maximum ratio composition diversity method, two demodulation circuits associated with the reception are needed. That is, although in the conventional maximum ratio composition diversity method, it is necessary to provide demodulation circuits associated with the reception which are equal in number to the antennas, one demodulation circuit associated with the reception is sufficient, irrespective of the number of anntennas, in the invention of the present application. Thus, it is possible to avoid that a size of a device configuration increases.

Therefore, the radio communication device of the present invention is able to achieve advantages that it is possible to avoid that a size of the device configuration increases and the reception level is lowered in a localized area.

Advantageous Effects of the Invention

The radio communication device of the present invention is configured as described above, and is able to achieve advantages that it is possible to avoid that a size of the device configuration increases and the reception electric field level is lowered in a localized area.

BRIEF DESCRIPTION OF THE DRAWINGS

FIG. 1 is a block diagram showing an exemplary configuration of a radio communication device according to Embodiment 1.

FIG. 2 is a block diagram showing an exemplary configuration of the radio communication device according to Embodiment 1.

FIG. 17 is a view showing exemplary table information showing a result of determination in error detection which is stored in the radio communication device according to Embodiment 4.

DETAILED DESCRIPTION OF THE PREFERRED EMBODIMENTS

Embodiment 1

Figure 3:
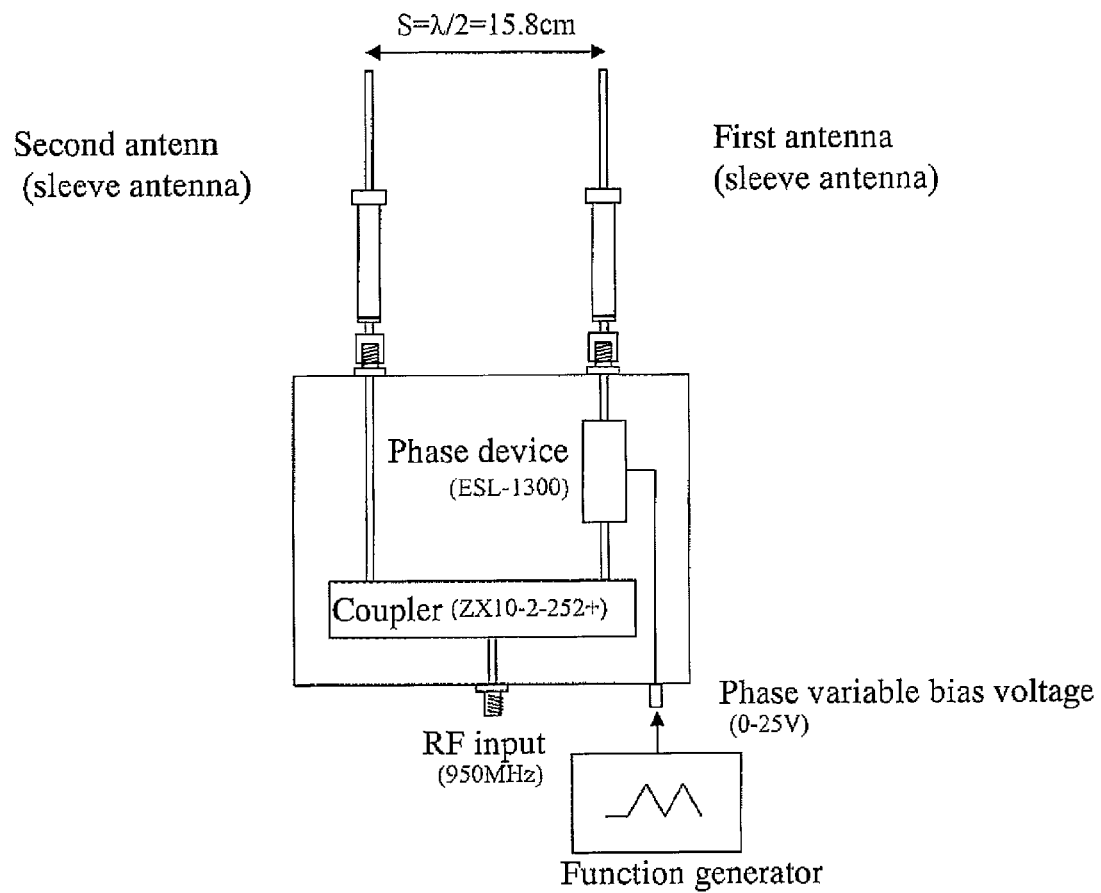
FIG. 3 is a view showing an exemplary layout of first and second anntennas in the radio communication device of FIG. 1.

FIG. 1 is a block diagram showing an exemplary configuration of a radio communication device according to Embodiment 1. As shown in FIG. 1, the radio communication device includes a first antenna 1, a second antenna 2, a phase varying section (phase varying means) 3, a synthesizing section (synthesizing means) 4, a phase control section (phase control means) 5, and a transmission/reception section 6. In FIG. 1, 7 indicates a first RF (radio frequency) signal, 8 designates a second RF (radio frequency) signal, and 9 designates a third RF (radio frequency) signal.

The RF signal received by the first antenna 1 is input to the phase varying section 3. The RF signal is input from the phase varying section 3 to the synthesizing section 4 as the first RF signal 7. The RF signal received by the second antenna 2 is input to the synthesizing section 4 as the second RF signal 8. The synthesizing section 4 sums up and synthesizes the first RF signal 7 and the second RF signal 8 to create the third RF signal 9 which is input to the transmission/reception section 6.

As shown in FIG. 2, the transmission/reception section 6 includes a reception circuit composed of a reception amplifier, a mixer, a demodulation circuit, etc., and a transmission circuit composed of a local oscillator, a modulation circuit, a transmission amplifier, etc. FIG. 2 is a block diagram showing an exemplary configuration of the radio communication device according to Embodiment 1. FIG. 2 shows a more detailed configuration of the transmission/reception section 6, in the radio communication device of FIG. 1.

A radio frequency used in the communication performed in the radio communication device according to Embodiment 1 is 950 MHz. A modulation method of the RF signals is FSK. A transmission rate of data is 100 kbps.

The first and second antennas are dipole antennas. A distance between the antennas is 15.8 cm which is ½ wavelength.

As shown in FIG. 3, the first and second antennas 1 and 2 extend vertically with respect to a ground. FIG. 3 is a view showing an exemplary layout of the first and second antennas in the radio communication device of FIG. 1. The first and second antennas 1 and 2 according to Embodiment 1 are implemented by 2-element dipole array antenna (continuous phase variable 2-element dipole antenna) which extend vertically and are able to vary a phase continuously. The phase varying section 3 is implemented by, for example, a phase device (ESL-1300). The synthesizing section 4 is implemented by a coupler (ZX10-2-252+).

Next, the configuration of the phase varying section 3 will be described with reference to FIGS. 4 to 7. FIGS. 4 to 7 show specific examples of circuits of the phase varying section 3.

Figure 4:
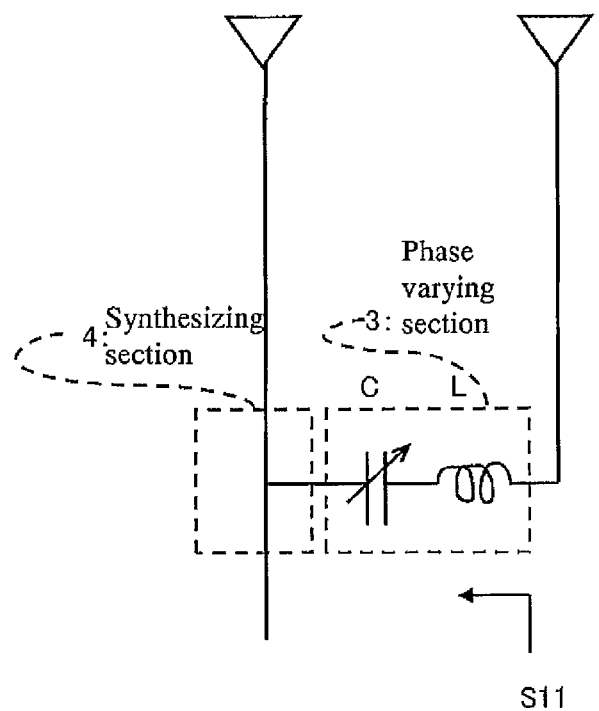
FIG. 4 is a view showing an exemplary configuration of a phase varying section in the radio communication device of FIG. 1.
Figure 5:
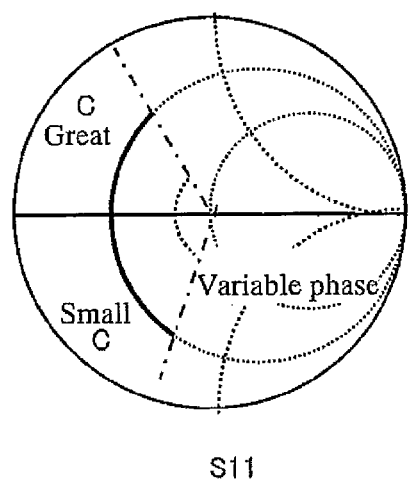
FIG. 5 is a view showing an exemplary change in an impedance in a case where the phase varying section is viewed from the antenna side in the radio communication device according to Embodiment 1.

FIG. 4 shows the configuration of the phase varying section 3 in which a coil (L) and a variable capacitor (C) are connected in series. FIG. 4 is a view showing an exemplary configuration of the phase varying section 3 in the radio communication device of FIG. 1. The phase varying section 3 is configured such that a capacitance of the variable capacitor is selected to cause a series resonance frequency of the coil and of the variable capacitor to be near a radio frequency when the capacitance of the variable capacitor is near a median value. When the capacitance of the capacitor is increased, an impedance of the circuit becomes inductive, while when the capacitance is decreased, the impedance becomes capacitive. FIG. 5 shows a change in the impedance in the case where the phase varying section 3 is viewed from the antenna side, which change is plotted on a Smith chart. FIG. 5 is a view showing an exemplary change of the impedance in the case where the phase varying section 3 is viewed from the antenna side in the radio communication device according to Embodiment 1. With reference to the Smith chart of FIG. 5, the phase can be varied by varying the capacitance of the variable capacitor. The phase varying section 3 has a simple configuration composed of the coil and the variable capacitor, as described above. Also, the synthesizing section 4 has a simple configuration in which the first antenna side and second antenna side are connected together. In FIGS. 4 and 5, S11 indicates S parameter.

Figure 6:
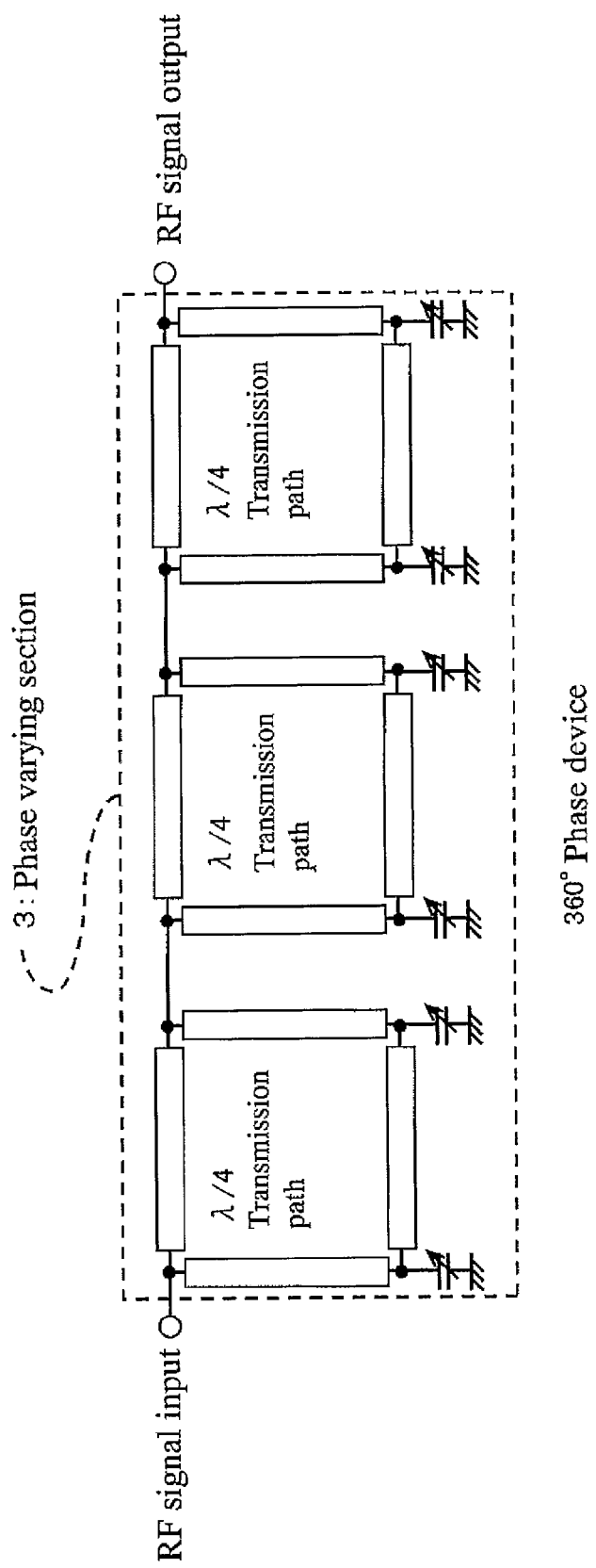
FIG. 6 is a view showing an exemplary circuit configuration of a phase varying section according to Embodiment 1.

More specifically, as shown in FIG. 6, for example, the phase varying section 3 may be configured such that the variable capacitor which is one-end grounded is connected to two terminals of 90-degree hybrid using four ¼ wavelength transmission lines. FIG. 6 is a view showing an exemplary circuit configuration of the phase varying section 3 in the radio communication device according to Embodiment 1.

By using the 90-degree hybrid, a change in the impedance which occurs by varying the phase amount can be reduced.

One-stage of 90-degree hybrid is able to attain a phase variation amount of 180 degrees at maximum. In the example of FIG. 6, three-stages of 90-degree hybrids are provided. A variation amount in one stage is 120 degrees, and therefore, a phase variation amount of 360 degrees at maximum is attained.

Figure 7:
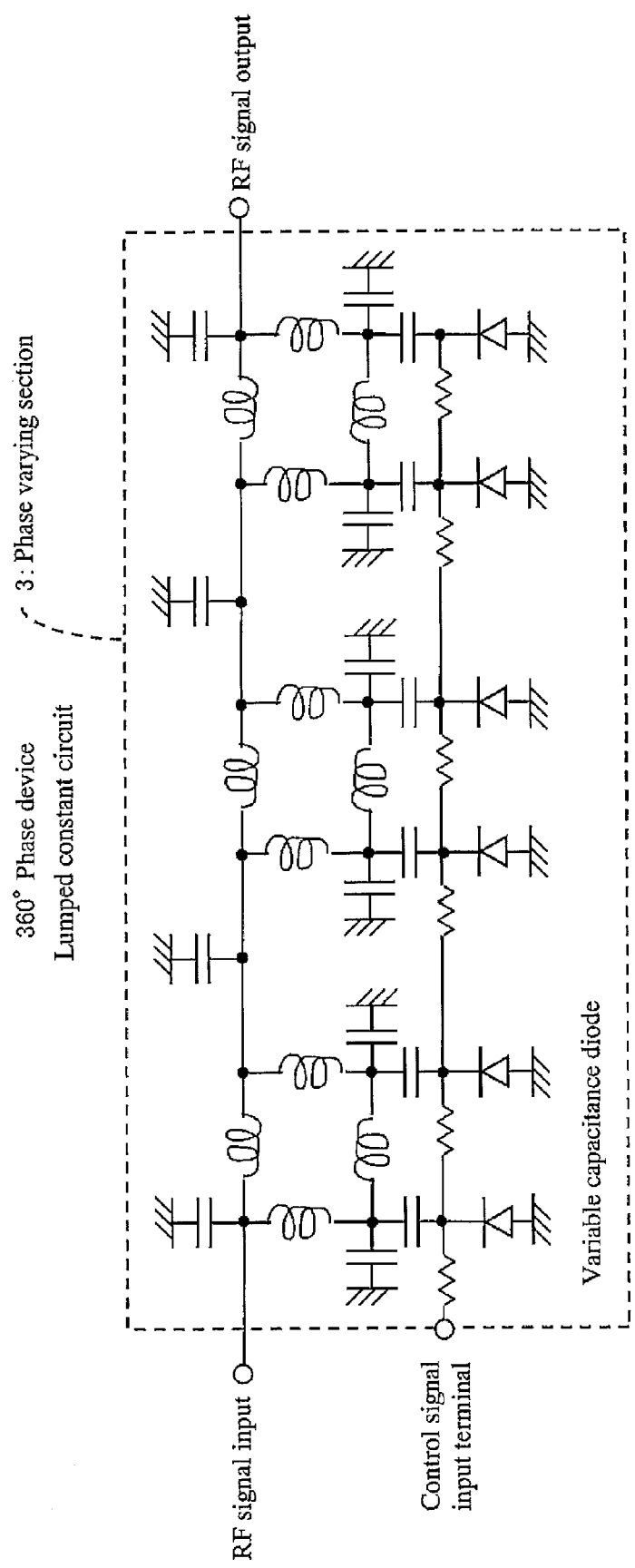
FIG. 7 is a view showing an exemplary circuit configuration of the phase varying section according to Embodiment 1.

FIG. 7 shows a configuration in which transmission lines constituting the phase varying section 3 of FIG. 6 are replaced by a lumped constant circuit. FIG. 7 is a view showing an exemplary circuit configuration of the phase varying section 3 according to Embodiment 1. By replacing the transmission lines by the lumped constant circuit, a size of the circuit can be reduced. The phase amount can be varied by changing a voltage applied to a variable-capacitance diode.

Figure 8:
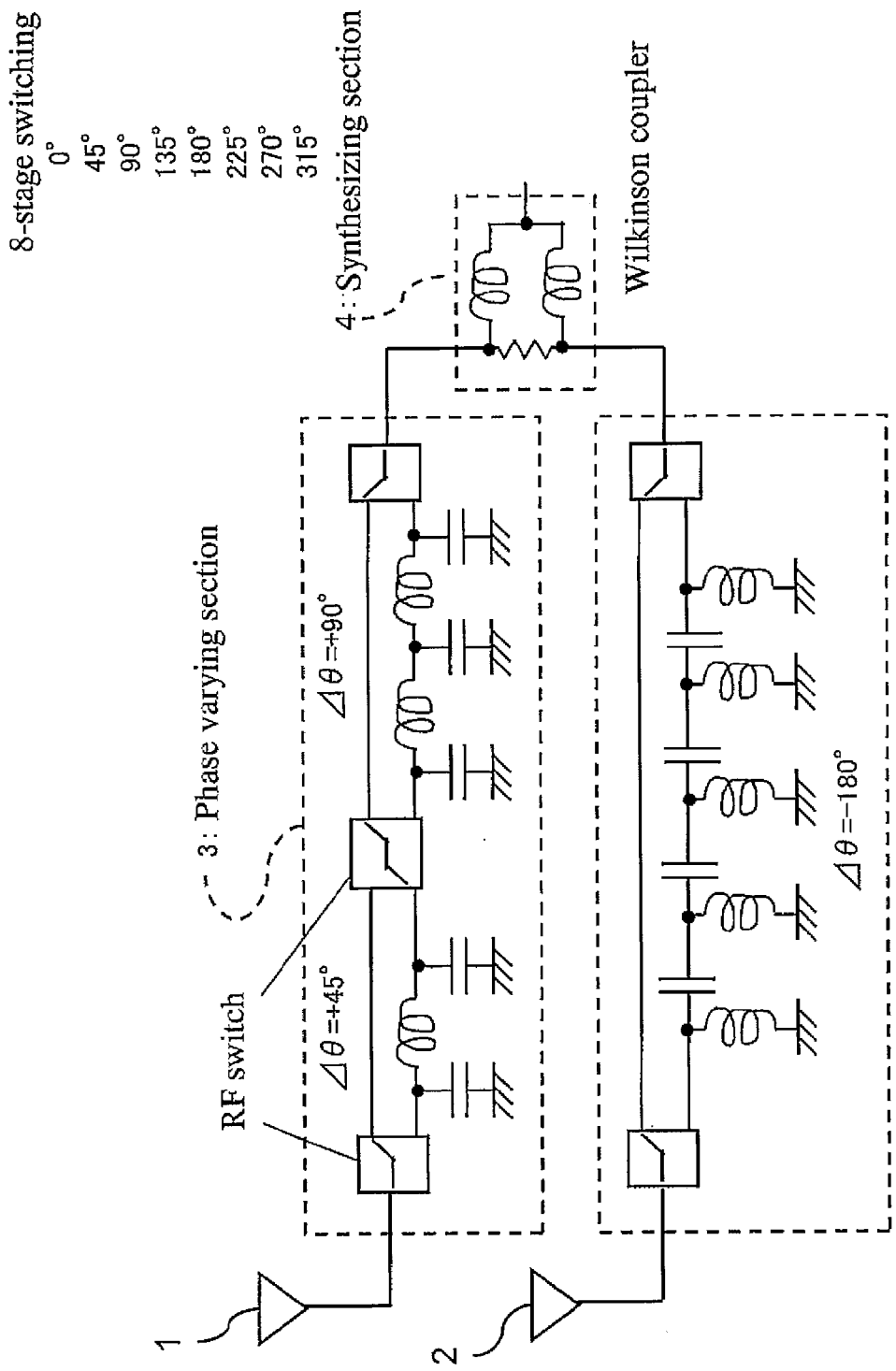
FIG. 8 is a view showing an exemplary configuration of a phase varying section which varies a phase amount in a stepwise manner.

Or, as shown in FIG. 8, the phase varying section includes a RF switch and is configured to vary the phase amount in a stepwise manner. FIG. 8 is a view showing an exemplary configuration of the phase varying section 3 which varies the phase amount in a stepwise manner. Unlike FIG. 7, FIG. 8 depicts the first and second antennas 1 and 2, and the synthesizing section 4. In the example of FIG. 8, the synthesizing section 4 is Wilkinson coupler. The Wilkinson coupler is able to provide isolation between two input terminals, and therefore able to reduce a mutually-coupled state between the first and second antennas 1 and 2.

The phase varying section 3 of FIG. 8 is configured to perform switching of lumped constant transmission line composed of coils and capacitors by using the RF switch, thereby implementing 8-stage phase variation amounts which vary 45 degrees in each stage (0 degree, 45 degrees, 90 degrees, 135 degrees, 180 degrees, 225 degrees, 270 degrees, and 315 degrees). The switching performed by the RF switch is performed in response to a control command issued from the phase control section (phase control means) 5.

As described above, the phase varying section 3 has a feature that it is able to vary the phase in a digital manner (discrete manner).

As the first and second antennas 1 and 2, desired antennas such as a monopole antenna, an inverted-F antenna, and a loop antenna, as well as the dipole antenna, may be employed. Note that a level of the mutually-coupled state between the antennas must be reduced to ensure the characteristics of the diversity antennas.

Although the distance between the first and second antennas 1 and 2 is the ½ wavelength, the distance may be selected as desired.

Figure 9:
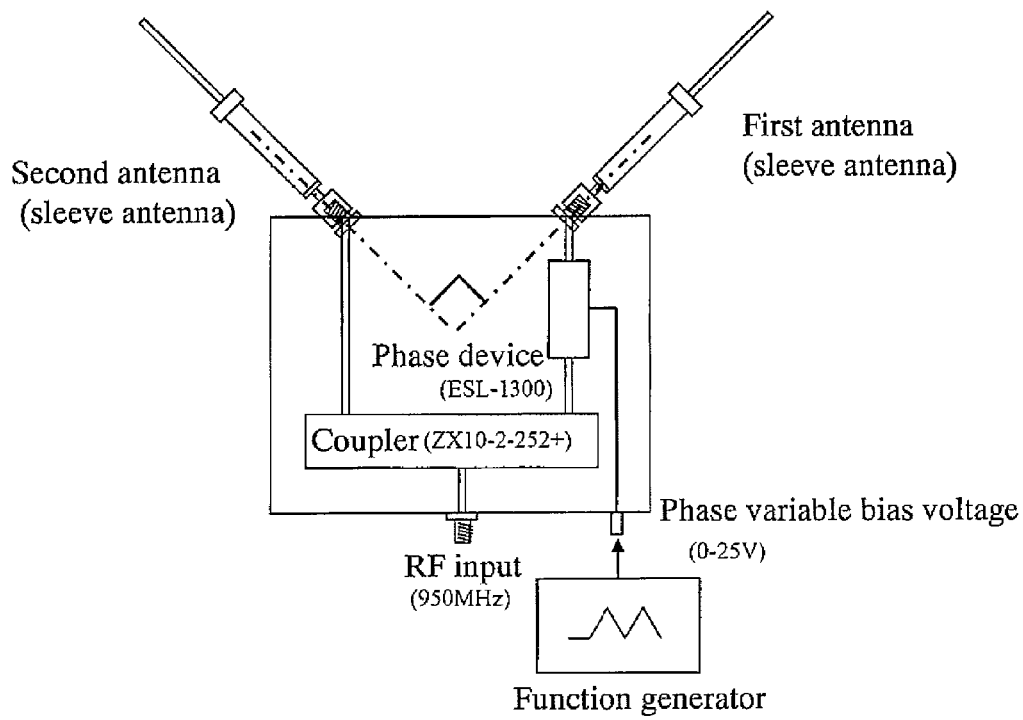
FIG. 9 is a view showing an exemplary layout of first and second antennas in the radio communication device of FIG. 1.

Although the first and second antennas 1 and 2 are laid out such that their polarization planes are oriented in parallel, the polarization planes may be orthogonal to each other. For example, as shown in FIG. 9, by laying out a first antenna 1a and a second antenna 1b such that they are orthogonal to each other on the same plane, advantages achieved by polarization diversity are attained, and lowering of the reception level can be avoided more effectively. FIG. 9 shows an exemplary layout of the first and second antennas 1 and 2 in which the first and second antennas 1 and 2 are orthogonal to each other. FIG. 9 is a view showing an exemplary layout of the first and second antennas in the radio communication device of FIG. 1. As shown in FIG. 9, the first and second antennas 1 and 2 are laid out such that the extending direction of the first antenna 1 and the extending direction of the second antenna 2 are orthogonal to each other. By laying out the first and second antennas 1 and 2 such that the extending direction of the first antenna 1 and the extending direction of the second antenna 2 are orthogonal to each other, the two polarization planes which are orthogonal to each other can be provided. By providing the two polarization planes which are orthogonal to each other, the phase of the phase varying section 3 can be varied even when a polarization plane direction of a reception-side antenna or a transmission-side antenna is different, thus achieving reception with a good reception level.

Although the radio frequency used in the communication in the radio communication device according to Embodiment 1 is 950 MHz, the present invention is not limited to this. A desired frequency can be used as the radio frequency used in the communication.

Although the modulation method of the RF signal is FSK in the radio communication device according to Embodiment 1, the present invention is not limited to this, and a desired modulation method can be used as the modulation method. A frequency modulation method in which an amplitude of a modulated wave contains no information can be especially suitably employed.

Although the phase variation amount in the phase varying section 3 is 360 degrees, it may be a desired phase variation amount. The advantages can be achieved by, for example, 180 degrees or 90 degrees.

Although the number of antennas is two, three or more antennas may be used, like general diversity antenna.

In Embodiment 1, the phase varying section 3 in the radio communication device at a transmission operation side does not vary the phase amount, but the phase varying section 3 in the radio communication device at a reception operation side varies the phase amount periodically or randomly by using the two antennas. However, the present invention is not limited to this configuration. For example, the same advantages can be achieved by providing a configuration in which the phase varying section 3 in the radio communication device at the reception operation side does not vary the phase amount, but the phase varying section 3 in the radio communication device at the transmission operation side varies the phase amount by using the two antennas.

Or, the same or more advantages can be achieved by performing communication in such a manner that the phase varying sections 3 in the radio communication devices at the transmission operation side and at the reception operation side vary the phase amounts simultaneously.

(Reception Process 1 of Packets)

Figure 10:
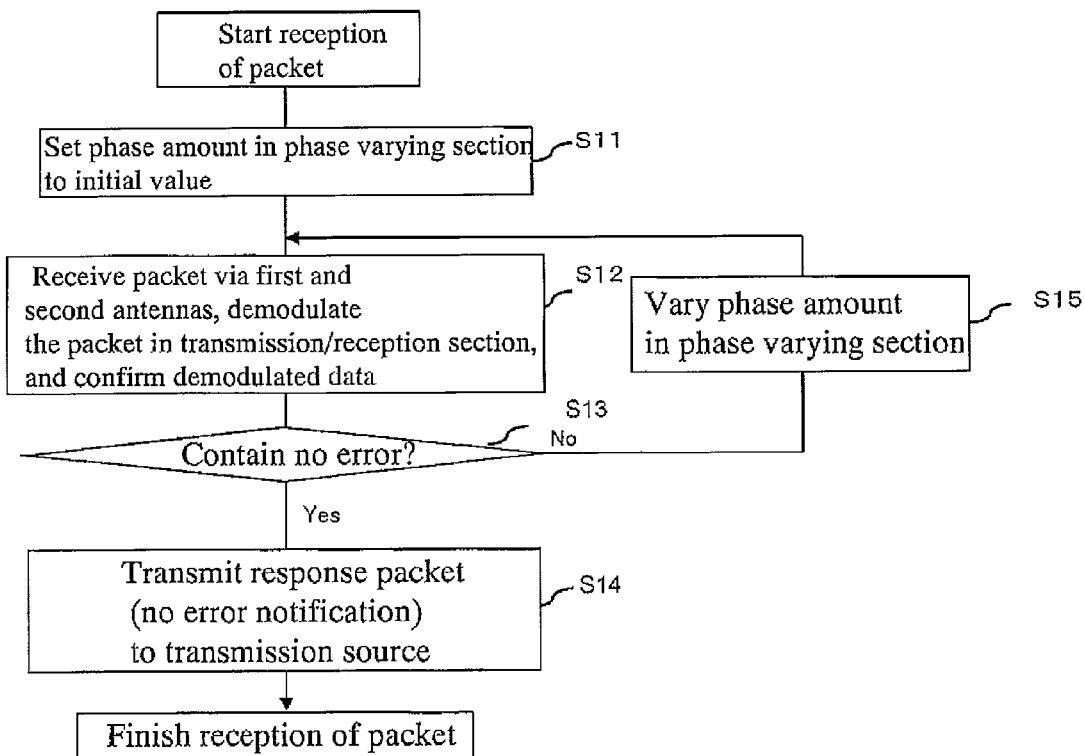
FIG. 10 is a flowchart showing an exemplary packet reception process in the radio communication device according to Embodiment 1.

Next, an operation flow relating to a reception process 1 of packets in the radio communication device according to Embodiment 1 will be described with reference to FIG. 10. FIG. 10 is a flowchart showing an exemplary packet reception process in the radio communication device according to Embodiment 1.

Figure 13:
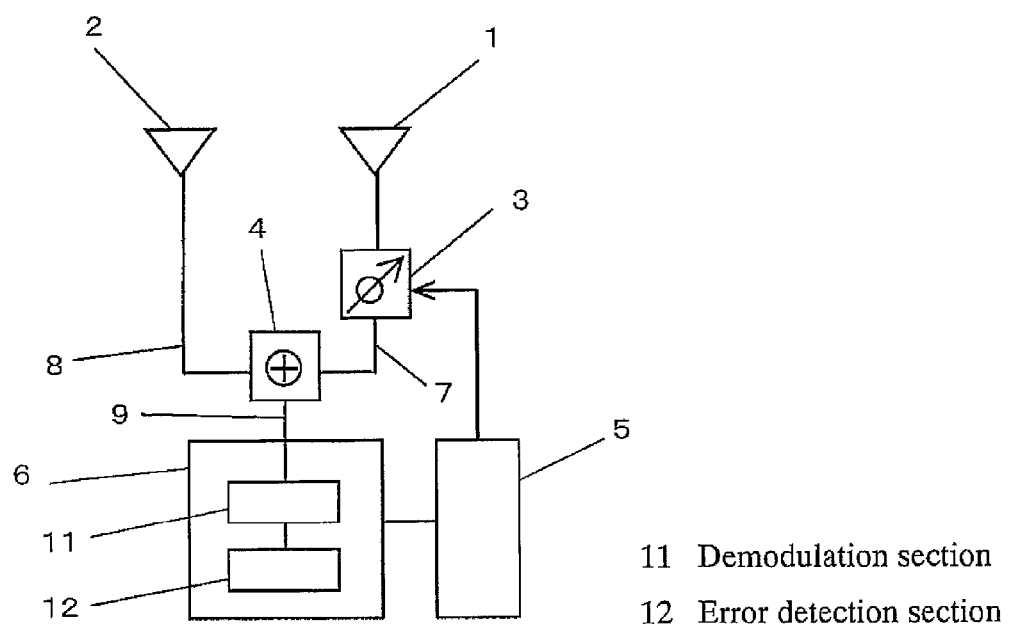
FIG. 13 is a block diagram showing an exemplary schematic configuration of a radio communication device according to Embodiment 1.

Prior to description of the reception process 1, the configuration of the transmission/reception section 6 which mainly performs the reception process will be described with reference to FIG. 13. FIG. 13 is a block diagram showing an exemplary schematic configuration of the radio communication device according to Embodiment 1. As shown in FIG. 13, the transmission/reception section 6 includes a demodulation section (demodulation means) 11 which demodulates a packet contained in the third RF signal 8 input from the synthesizing section 4 and an error detection section (error detection means) 12 which detects whether or not data of the packet demodulated by the demodulation section 11 contains an error.

The transmission/reception section 6 including the demodulation section 11 and the error detection section 12 as described above performs the reception process 1 of the packets as described below.

Initially, the phase control section 5 sets the phase amount in the phase varying section 3 to an initial value (step S11, hereinafter referred to as S11). The first and second antennas 1 and 2 receive the packets. The transmission/reception section 6 demodulates the received packets and confirm the demodulated data (S12). That is, the first and second antennas 1 and 2 receive radio waves in a specified frequency range, carrying the packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8.

The synthesizing section 4 synthesizes the first RF signal 7 and the second RF signal 8 and transmits the third RF signal 9 to the transmission/reception section 6. In the transmission/reception section 6, the demodulation section 11 demodulates the data of the packet contained in the third RF signal 9, and the error detection section 12 confirms whether or not the data contains an error based on the demodulated data. The error detection of the data in the transmission/reception section 6 is performed by utilizing CRC (cyclic redundancy check). The error detection method is not limited to this. For example, parity check, Hamming code check, etc., may be utilized.

When the error detection section 12 determines that data of the received packet contains an error ("NO" in S13), it notifies the phase control section 5 that the data of the received packet contains an error. In response to the notification from the transmission/reception section 6, the phase control section 5 causes the phase varying section 3 to vary the phase amount. The phase varying section 3 varies the phase amount (S15). After the phase varying section 3 has varied the phase amount, the processing in S12 and in S13 are performed again.

If the error detection section 12 determines that the data of the received packet contains no error in S13 ("YES" in S13), the transmission/reception section 6 generates a response packet containing notification information indicating that the reception is completed without an error, and transmits the response packet to a transmission source (S14).

As described above, the radio communication device according to the present embodiment can perform the reception process of the packets.

As described above, in the radio communication device according to Embodiment 1, the error detection section 14 in the transmission/reception section 6 is configured to confirm whether or not the data of each received packet contains an error. When the error detection section 14 in the transmission/reception section 6 determines that the data of the received packet contains an error, the phase control section 5 causes the phase varying section 3 to vary the phase amount.

Therefore, even when the reception level is significantly lowered in a location at which the radio communication device is installed, due to fading, etc., the phase varying section 3 varies the phase of the RF signal received by the first antenna, thereby preventing cancellation of electric field levels and avoiding lowering of the reception level. And, the phase varying section 3 varies the phase amount until the error detection section 12 detects that the data of the received packet contains no error. In other words, the phase amount can be varied until data containing no error can be received.

Embodiment 2

The radio communication device according to Embodiment 1 is configured in such a manner that the phase varying section 3 varies the phase amount in response to the control command of the phase control section 5 depending on whether or not the data of the received packets contains an error. The radio communication device may be configured to vary the phase amount in fixed cycles. Hereinafter, a description will be given of Embodiment 2 which is a case where when a cycle in which the phase amount is varied repetitively is a cycle T1, T1 is set smaller than a time length T2 required to transmit 1-bit data.

Figure 11:
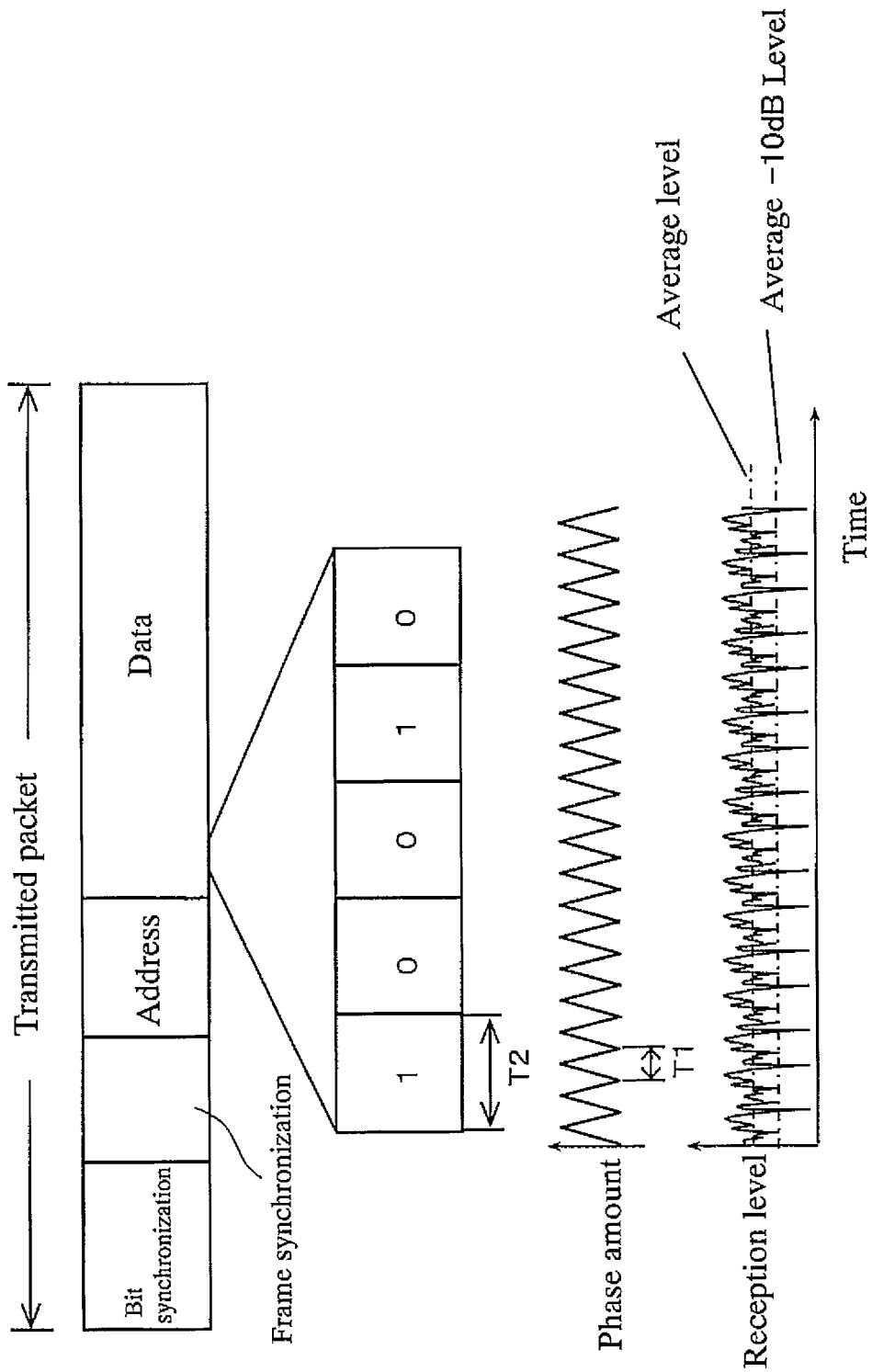
FIG. 11 is a view showing a transmitted packet, a variation in a phase amount which is caused by the phase varying section, and a change in a reception level in a radio communication device according to Embodiment 2.

FIG. 11 is a view showing a transmitted packet, a variation in a phase amount which is caused by the phase varying section 3 and a change in the reception level in the radio communication device according to Embodiment 2. That is, the phase varying section 3 varies the phase amount set therein in response to the control signal output from the phase control section 5. A changing cycle of the reception level is decided according to a timing of the variation in the phase amount. How an error occurs in the data of the received packet is different according to the changing cycle of the reception level. In view of this, in Embodiment 2, a relationship satisfying T1<T2 is set.

The radio communication device according to Embodiment 2 is identical in configuration to the radio communication device according to Embodiment 1 of FIG. 1 or FIG. 13 except that the transmission/reception section 6 need not include the error detection section 12. Therefore, the components included in the radio communication device according to Embodiment 2 will not be described in repetition.

As described above, the phase varying section 3 varies the phase amount set therein, in response to the control signal output from the phase control section 5. In the present embodiment, the phase amount is varied cyclically (periodically) (see FIG. 11). The repetition cycle in which the phase amount is varied is the cycle T1. The time length (1-bit time) required to transmit 1-bit data is T2. In Embodiment 2, a transmission rate is 100 kbps, and therefore, T2=10 μsec.

As described above, T1 is set such that T1<T2. In the example of FIG. 11, T1=T2/3.5. It is assumed that an environment in which the radio communication device of the present embodiment is installed is such that a relationship between a reception level and a presence probability of the radio communication device complies with a Reyleigh distribution of FIG. 32 (the same occurs in Embodiment 3 and Embodiment 4 as will be described later).

Figure 32:
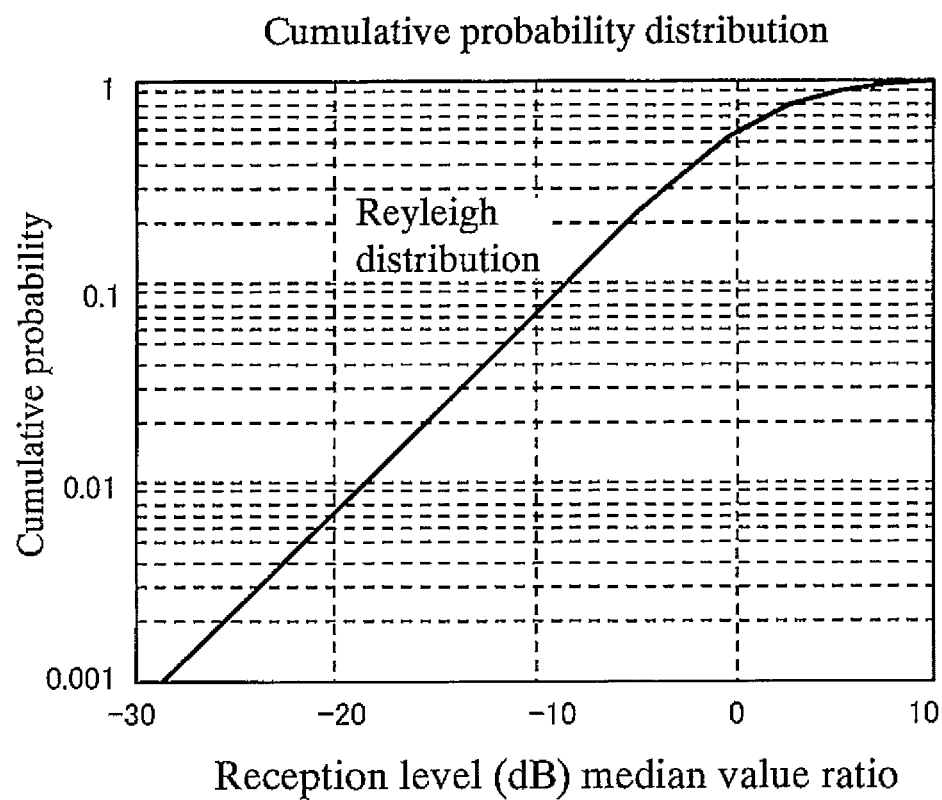
FIG. 32 is a view of a probability distribution showing a relationship between a reception level and a probability with which a radio communication device is present in this reception level.

With reference to FIG. 11, an electric power level (reception level) of the third RF signal 9 changes up and down at time intervals shorter than the T1 cycle. This changing cycle is a change of a time interval which is shorter than T1 (one/ several (a fraction) to one/several tens (a few percentage)) and therefore is much shorter than T2 which is 1-bit time length of the received data. As shown in FIG. 32, a time ratio in which the reception level is lower than an average value level (or median value level) by 10 dB or more occupies 10% of the total, and 90% or greater of the total is in a range of average value level±10 dB. Because of this, the reception level of the total is averaged and is not lowered significantly, which can maintain a stable reception level.

As described above, in the present configuration in which the phase varying section 3 causes a period to be varied cyclically or randomly in the cycle T1 which is as short as T1<T2, it becomes possible to avoid that the reception level is lowered significantly. That is, by the configuration in which the phase varying section 3 varies the phase amount cyclically in the short period T1 (T1<T2) or varies the phase amount in the random period T1 shorter than T2, lowering of the reception level in a localized area can be avoided, and reliable reception can be implemented for each 1 bit constituting the transmitted packet.

(Reception Process 2 of Packets)

Figure 12:
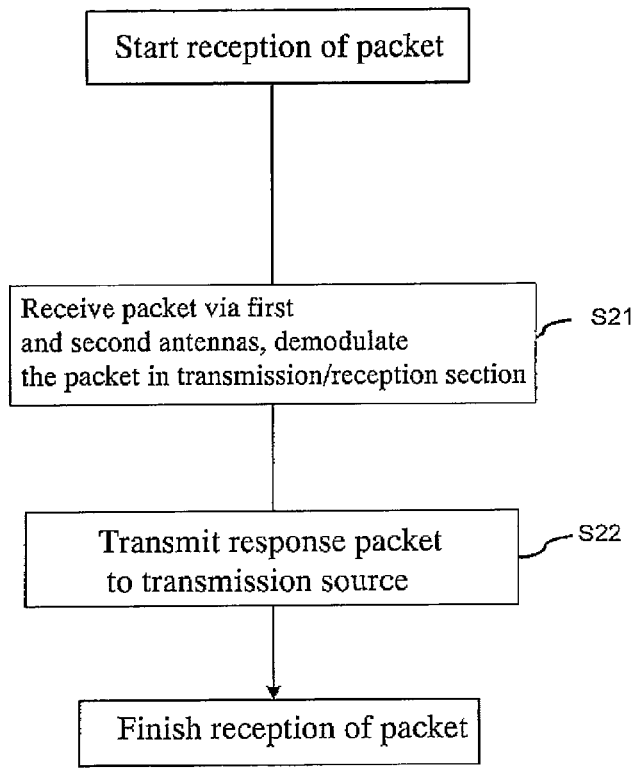
FIG. 12 is a flowchart showing an exemplary packet reception process in the radio communication device according to Embodiment 2.

Next, an operation flow relating to a reception process 2 of packets in the radio communication device according to Embodiment 2 will be described with reference to FIG. 12. FIG. 12 is a flowchart showing an exemplary packet reception process in the radio communication device according to Embodiment 2.

The first and second antennas 1 and 2 receive the packets. The transmission/reception section 6 demodulates the received packets (S21). That is, the first and second antennas 1 and 2 receive radio waves in a specified frequency range, carrying the packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8. The synthesizing section 4 synthesizes the first RF signal 7 and the second RF signal 8 and transmits the third RF signal 9 to the transmission/reception section 6. In the transmission/reception section 6, the demodulation section 11 demodulates the third RF signal.

While the packets are being received in step S21, the phase control section 5 causes the phase varying section 3 to continuously vary the phase amount in a cycle satisfying a predetermined condition. The variation in the phase amount in the phase varying section 3 at this time is set such that the varying cycle T1 is shorter than 1-bit time length of the received transmitted packet and satisfies the relationship of T1<T2 (=10 μsec) as described above.

After the received packet (transmitted packet) has been demodulated as described above, the transmission/reception section 6 generates a response packet containing information indicating that the reception is completed, and transmits the response packet to a transmission source (S22).

By varying the phase amount quickly in the cycle shorter than the 1-bit data of the received packet as described above and averaging the change (fluctuation) in the reception level, significant lowering of the reception level does not occur, and stable reception level can be maintained, while 1-bit data is being received. As a result, a bit error due to the lowered reception level will not occur in data of each bit of the received transmitted packet.

This eliminates a need for the error detection section 12 for detecting whether or not the data of the received packet contains an error, in the radio communication device according to Embodiment 2.

Although the above stated configuration for varying the phase amount at a high speed can be utilized effectively in frequency modulation or the like in which no information is contained in an amplitude direction, in a modulated signal of the received packet, it cannot be utilized in a modulation method (phase modulation or the like) containing information in the amplitude direction.

Embodiment 3

Next, a description will be given of Embodiment 3, which is a case where the cycle T1 for varying the phase amount repetitively is set greater than T3 which is a time length of the transmitted packet, in a configuration for varying the phase amount in fixed cycles, with reference to FIG. 14.

The radio communication device according to Embodiment 3 has a configuration similar to that of the radio communication device according to Embodiment 1 of FIG. 13, and therefore, the components will not be described in repetition. The radio communication device according to Embodiment 3 is different from the radio communication device according to Embodiment 1 in that a transmission source sequentially transmits a packet containing the same content to the radio communication device.

In Embodiment 3, the error detection section 12 is provided to detect an error in the received data like Embodiment 1. Therefore, it is possible to confirm whether or not the data has been received correctly.

Figure 14:
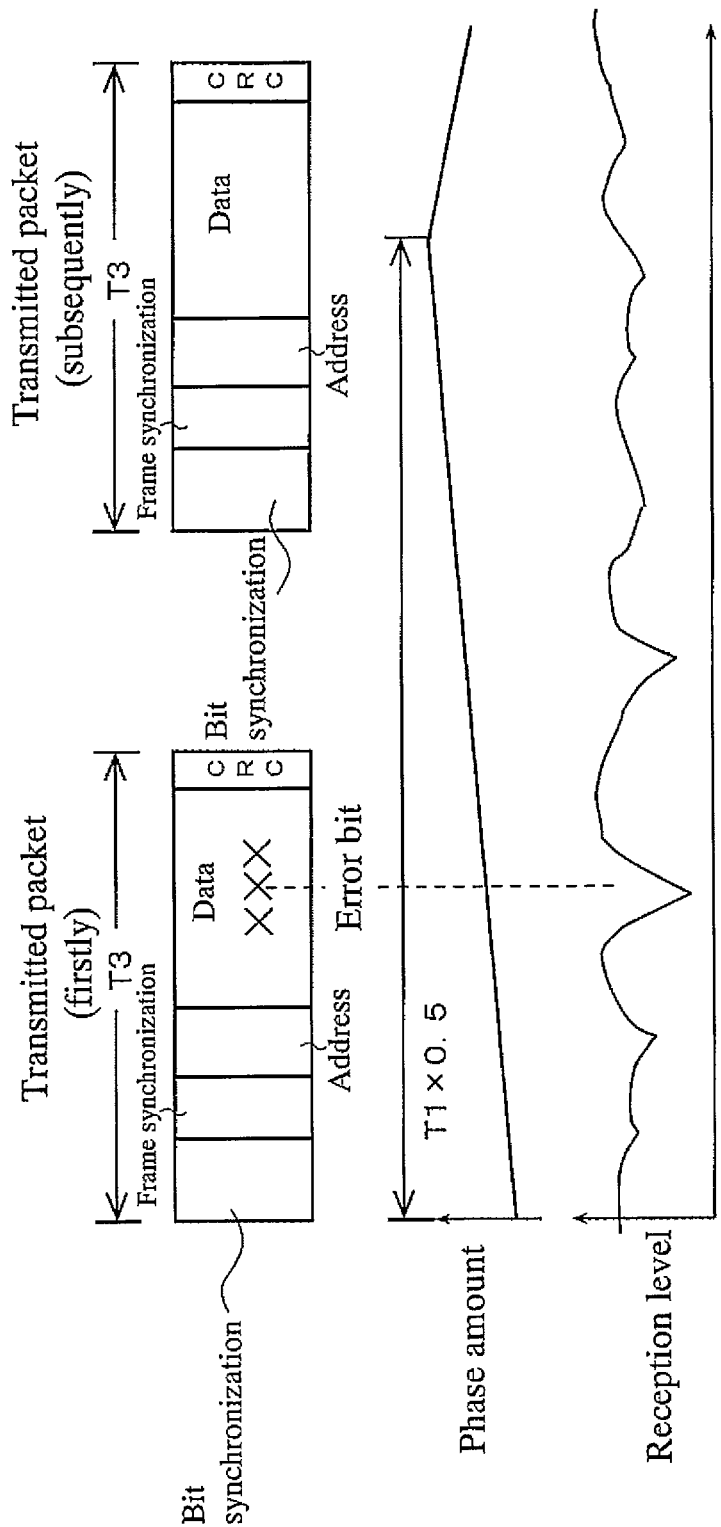
FIG. 14 is a view showing a transmitted packet received by a radio communication device according to Embodiment 3, a variation in a phase amount which is caused by the phase varying section in the radio communication device, and a change in a reception level in the radio communication device.

FIG. 14 is a view showing a transmitted packet received by a radio communication device according to Embodiment 3, a variation in a phase amount which is caused by the phase varying section 3 in the radio communication device and a change in a reception level in the radio communication device.

As described above, the phase varying section 3 varies the phase amount in response to the control signal output from the phase control section 5. In the radio communication device according to Embodiment 3, the cycle in which the phase amount is varied repetitively is T1, and the time length of the transmitted packet is T3. In the radio communication device according to Embodiment 3, the length of the transmitted packet is 128 bytes and the time length T3=10.2 msec.

In the radio communication device according to Embodiment 3, T1 is set such that T3<T1. In the example of FIG. 14, T1=4×T3.

With reference to FIG. 14, significant lowering of the reception level occurs at a timing at which an almost center portion of a data portion of the packet which is transmitted firstly, is received, and the received data contains an error. The error detection section 12 can detect this error by receiving CRC error check data provided at a tail of the transmitted packet.

In the radio communication device according to Embodiment 3, when the error detection section 12 detects an error in the received data of the packet which is transmitted firstly, this transmitted packet is discarded. Then, the transmitted packet which is re-transmitted (transmitted subsequently) from the transmission source is received. At this time, if no error is detected in the data of the packet which is re-transmitted, this data is adopted as correct data.

Next, a description will be given of advantages achieved by setting made such that T1 satisfies the relationship of T3<T1 in the radio communication device.

In the radio communication device according to Embodiment 3, T1 is set greater than T3. Therefore, the reception level changes relatively gently in the case where the phase varying section 3 varies the phase amount. Because of this, in the configuration in which a plurality of transmitted packets are received successively, the transmitted packets are not received at timings with the same phase amount. This reduces a possibility that different transmitted packets are received at the reception levels which are equally lowered. In other words, regarding a reception period of one packet, the reception level changes gently, and the significantly lowered reception level occupies 10% or less within the period T1 (see FIG. 32). Therefore, even when lowering of the reception level occurs in the middle of reception of one packet, and an error bit is detected in that received packet, a possibility that lowering of the reception level occurs in the middle of reception of the packet which is transmitted subsequently, is low. For example, as shown in FIG. 14, although significant lowering of the reception level occurs in the middle of reception of the packet which is transmitted firstly, a possibility that lowering of the reception level occurs in the same manner in the middle of reception of the re-transmitted packet (packet transmitted subsequently), is low.

Even if an error is detected in the packet transmitted firstly and in the packet re-transmitted, a possibility that received data without an error is attained becomes higher by receiving a packet transmitted subsequently.

(Reception Process 3 of Packets)

Figure 15:
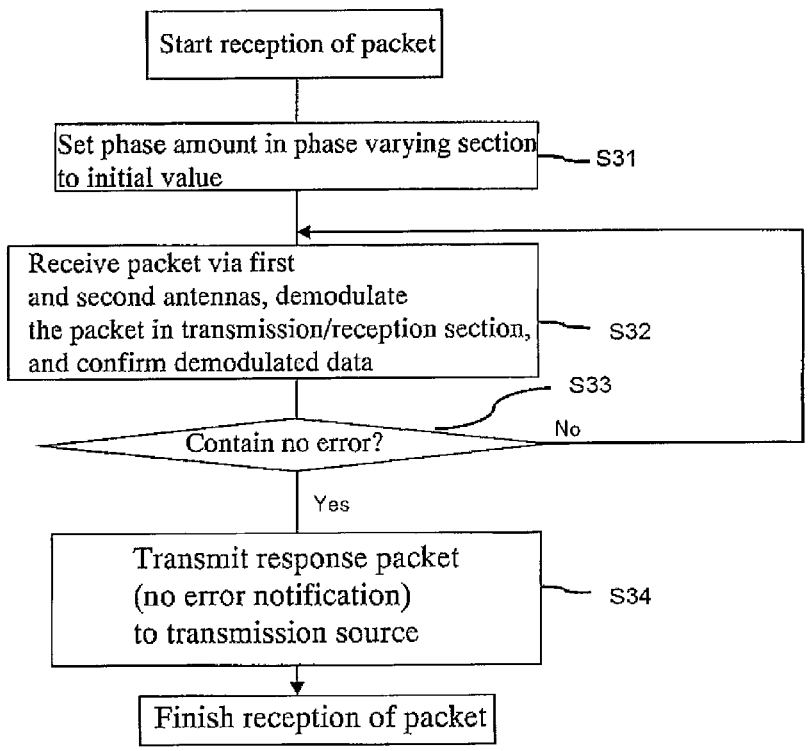
FIG. 15 is a flowchart showing an exemplary packet reception process in the radio communication device according to Embodiment 3.

Next, an operation flow relating to a reception process 3 of packets in the radio communication device according to Embodiment 3 will be described with reference to FIG. 15. FIG. 15 is a flowchart showing an exemplary packet reception process in the radio communication device according to Embodiment 3.

Initially, the phase control section 5 sets the phase amount in the phase varying section 3 to an initial value (S31). The first and second antennas 1 and 2 receive the packets. The transmission/reception section 6 demodulates the received packets (S32). That is, the first and second antennas 1 and 2 receive radio waves in a specified frequency range, carrying the packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8. The synthesizing section 4 synthesizes the first RF signal 7 and the second RF signal 8 and transmits the third RF signal 9 to the transmission/reception section 6. In the transmission/reception section 6, the demodulation section 11 demodulates the third RF signal 9, and the error detection section 12 confirms whether or not the demodulated data contains an error. The data error detection is performed by the error detection section 12 of the transmission/reception section 6 by utilizing CRC (cyclic redundancy check) as described above. The error detection method is not limited to this. For example, parity check, or Hamming code check may be utilized.

While the packets are being received in step S32 in the radio communication device, the phase control section 5 causes the phase varying section 3 to continuously vary the phase amount repetitively in cycles satisfying a predetermined condition. As described above, the cycle in which the phase varying section 3 varies the phase amount repetitively is set such that the varying cycle T1 is longer than the packet length of the received transmitted packet and satisfies a relationship of T3<T1 (10.2 msec).

When the error detection section 12 in the transmission/reception section 6 determines that the data of the received packet contains an error ("NO" in S33), the process returns to S32, and the transmission/reception section 6 receives and demodulates the packet transmitted subsequently and containing the same content as that of the packet transmitted firstly.

When the error detection section 12 in the transmission/reception section 6 determines that the data of the received packet contains no error ("YES" in S33), the transmission/reception section 6 generates a response packet containing notification information (no error notification) indicating that the transmitted packet in which the data contains no error has been received, and transmits the response packet to the transmission source (S34).

As described above, in the case where the cycle in which the phase amount is varied repetitively is set longer than the packet length of the transmitted packet, the phase amount does not vary significantly during a period for which each transmitted packet is received. Although the reception level of a transmitted packet which is received with a certain phase amount continues to be lowered and the transmitted packet contains an error during reception, the phase amount varies and the transmitted packet can be received in a state of a good reception level at a timing when another transmitted packet is received subsequently. In this case, the transmitted packet which is received with a good reception level and in which the data contains no error is adopted, and the packet of the data containing the error is discarded. Thus, the radio communication device is able to receive the transmitted packet correctly.

Embodiment 4

Next, a description will be given of Embodiment 5, which is a case where the cycle T1 which is a cycle for varying the phase amount repetitively is set smaller than T3 which is the time length of the transmitted packet and greater than the time T2 which is 1-bit of received data, in a configuration for varying the phase amount in fixed cycles, with reference to FIGS. 16 to 18.

Figure 16:
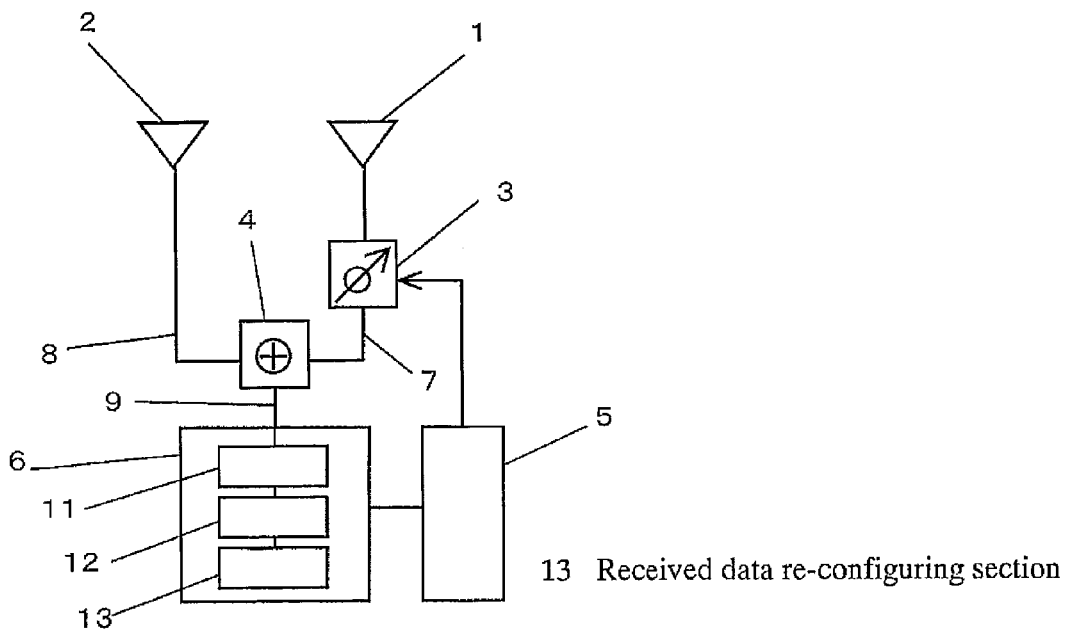
FIG. 16 is a block diagram showing an exemplary configuration of a radio communication device according to Embodiment 4.

FIG. 16 is a block diagram showing an exemplary configuration of a radio communication device according to Embodiment 4. FIG. 17 is a view showing exemplary table information showing a result of determination in error detection which is stored in the radio communication device according to Embodiment 4. FIG. 18 is a view showing a transmitted packet received by the radio communication device according to Embodiment 4, a variation in a phase amount which is caused by the phase varying section 3 in the radio communication device, and a change in a reception level in the radio communication device.

As shown in FIG. 16, the radio communication device according to Embodiment 4 is different in configuration (see FIG. 13) from the radio communication device according to Embodiment 1 in that the radio communication device according to Embodiment 4 further includes a received data re-configuring section (re-configuring means) 13. The other components are identified by the same reference symbols and will not be described in repetition.

In Embodiment 4, the transmission/reception section 6 further includes the received data re-configuring section 13 in addition to the demodulation section 11 and the error detection section 12 for detecting an error of the received data. Embodiment 4 is different from Embodiment 1 to Embodiment 3 as described above in that received data can be re-configured by connecting partial data of received data in a plurality of transmitted packets together. Hereinafter, the radio communication device according to Embodiment 4 will be described specifically.

As described above, the radio communication device according to Embodiment 4 is configured in such a manner that the phase varying section 3 varies the phase of the first RF signal in response to the control signal output from the phase control section 5, thereby varying the phase amount. In Embodiment 4, the cycle in which the phase amount is varied repetitively is T1, the time length of 1-bit of the received data is T2, and the time length of the received transmitted packet is T3. In Embodiment 4, T2=10 μsec, and the time length T3=10.2 μsec.

In the radio communication device according to Embodiment 4, T1 is set such that T2<T1<T3. In the example of FIG. 18, T1=0.5×T3.

A data portion of a packet transmitted from a transmission side has been subjected to BCH (32.16) error detection encoding. Error detection is enabled for every partial data of 16 bits. That is, the transmitted packet is such that data number (information bit number) is 16 and redundancy bits are 16 bits. The redundancy bits are added so that data portion is dividable by generating polynomial by using a shift register (not shown), mod2 (not shown) and an adder (not shown).

Figure 18:
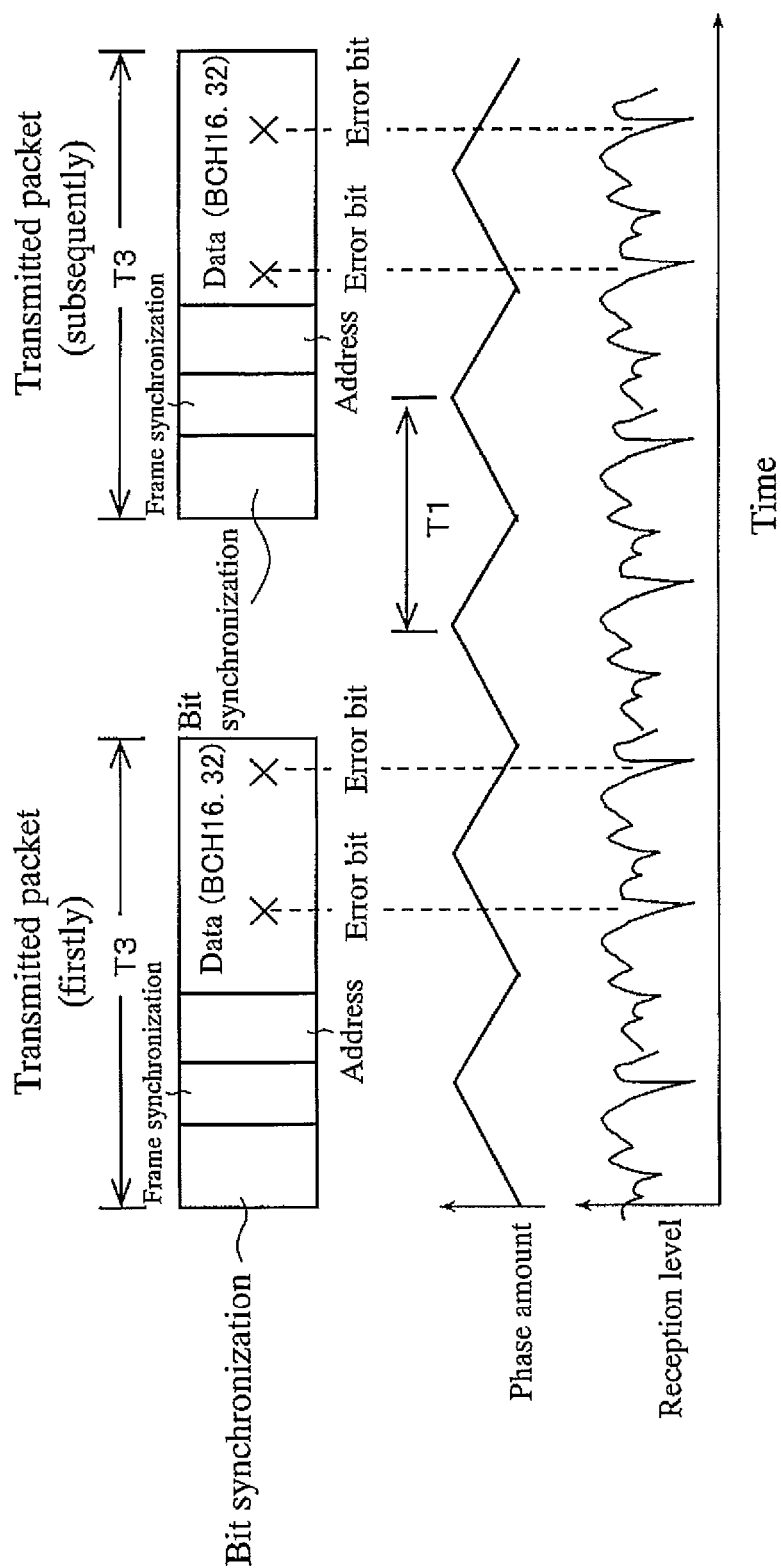
FIG. 18 is a view showing a transmitted packet received by a radio communication device according to Embodiment 4, a variation in a phase amount which is caused by the phase varying section in the radio communication device, and a change in a reception level in the radio communication device.

With reference to FIG. 18, in the reception of the packet transmitted firstly, the reception level is significantly lowered in plural locations, and errors occur there. In the reception of the transmitted packet, the error detection section 12 detects whether or not an error is present for every 16 bits, and stores partial data containing no error and partial data containing an error.

Then, a packet re-transmitted (transmitted subsequently) is received. At this time, also, partial data containing no error and partial data containing an error are stored for every 16 bits. In the configuration in which T1 is set such that T2<T1<T3, a possibility that part of the data in each of received packets contains an error is high.

Then, the received data re-configuring section 13 selects partial data for which the error detection section 12 determines that there are no errors, from partial data of the plurality of transmitted packets, and re-configures a received data stream containing no error by sequentially connecting together partial data containing no error. More specifically, data demodulated by the demodulation section 11 is stored in a memory which is not shown. The data is stored in the memory such that packet numbers correspond to data numbers, respectively. More specifically, packet numbers are assigned to the transmitted packets, respectively (numbers of 1 to 6 are assigned to the packets in the order in which the packets are received). In addition, data numbers are assigned to partial data obtained by dividing data of each packet by 16 bits (data numbers of 1 to 12 are sequentially assigned to data from a head, in every 16 bits). The packet numbers and the data numbers are stored in the memory such that the packet numbers correspond to the data numbers, respectively.

The error detection section 12 executes BCH error detection for data number (data corresponding to every 16 bits) for the data of each packet stored in the memory, to determine whether or not the error is present (in the example of FIG. 17, o indicates absence of an error and x indicates presence of an error). The error detection section 12 stores results of determination in the memory as table information of FIG. 17. FIG. 17 shows a correspondence among the packet numbers of the transmitted packets, the data numbers of the data of the transmitted packets, and error information indicating whether or not the data corresponding to the data numbers contain errors. Although in the example of FIG. 17, the partial data containing no error and the partial data containing an error are stored in the memory as the table information, only the partial data containing no error may be stored in the memory.

The received data re-configuring section 13 rec-configures data by combining data containing no error in the plurality of packets based on the results of determination in the error detection (table information of FIG. 17).

Next, a description will be given of advantages achieved by setting T1 so that a time relationship of T2<T1<T3 is satisfied in the radio communication device.

An electric power level (reception level) of the third RF signal 9 changes up and down at time intervals shorter than the cycle of T1, and the reception level change in FIG. 18 occurs. This changing cycle is shorter than T1 (i.e., one/several (a fraction) to one/several tens (a few percentage)). The reception level continues to be lowered for a time length of the same order as T2. Because of this, a probability that errors of about several bits occur is high. Error detection of several bits can be performed surely based on the BCH error detection codes, etc. That is, in the radio communication device, by setting the relationship of T2<T1<T3, the data (partial data) containing errors in the respective received packets can be detected surely by the error detection codes, etc., and identified. By embedding the error detection codes in the transmitted packets, partial data containing no error in the respective packets can be identified and correct data can be restored by connecting together these identified partial data.

A time for which the reception level of each transmitted packet is significantly lowered is shorter (e.g., about 10%) than the overall time T1. Therefore, a possibility that, when the plurality of packets transmitted repetitively are received, an error occurs in the same partial data positions in the plurality of transmitted packets, is low.

If T1 is set greater than T3, it is assumed that an error in data continues for a long time. Therefore, if T1 is set to be greater than T3, there is a possibility that the error cannot be determined accurately by the BCH error detection code. In the configuration of the radio communication device according to Embodiment 4, there may be a possibility that an operation for detecting and correcting the error in the data will be performed erroneously. In view of this, in the case of the configuration of Embodiment 4, the relationship of T2<T1<T3 is preferably set.

If T1 is set smaller than T2, the configuration of Embodiment 4 may be possibly used, but the configuration of Embodiment 2 may be used as described above. In the configuration of the radio communication device according to Embodiment 4, it becomes possible to achieve a greater advantage that correct data can be restored in a cycle longer than T1<T2, i.e., T2<T1. In addition, it becomes possible to achieve a greater advantage that the configuration of the radio communication device according to Embodiment 4 is applicable to the modulation method (phase modulation or the like) containing information in an amplitude direction.

(Reception Process 4 of Packets)

Figure 19:
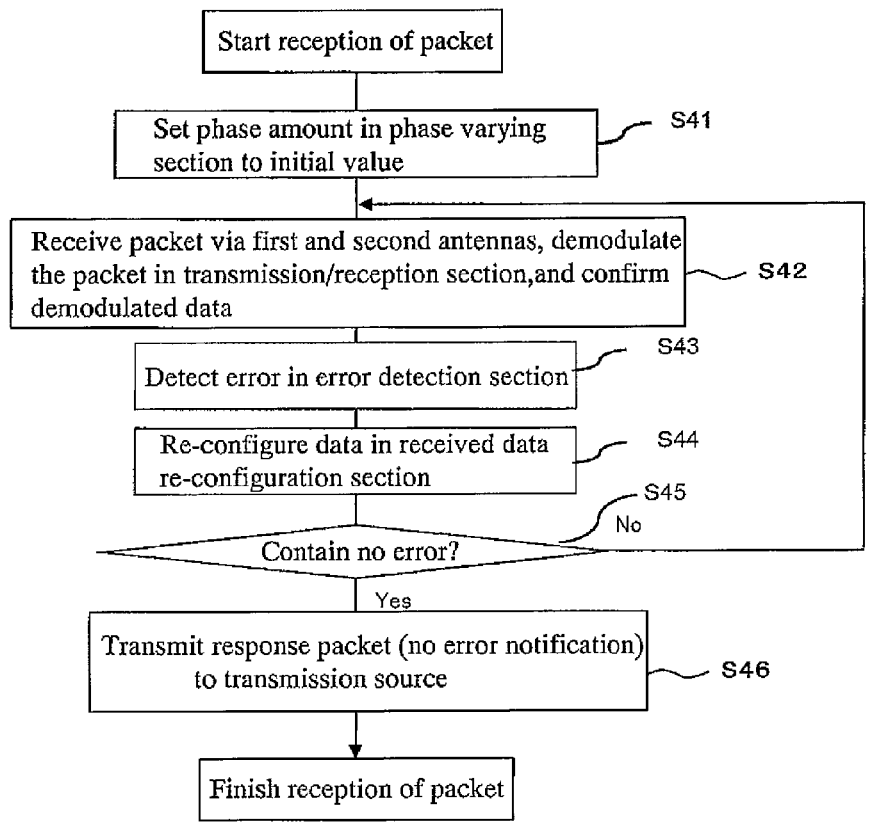
FIG. 19 is a flowchart showing an exemplary packet reception process in the radio communication device according to Embodiment 4.

Next, a description will be given of an operation flow relating to a reception process of packets in the radio communication device according to Embodiment 4, with reference to FIG. 19. FIG. 19 is a flowchart showing an exemplary packet reception process in the radio communication device according to Embodiment 4.

Initially, the phase control section 5 sets the phase amount in the phase varying section 3 to an initial value (S41). The first and second antennas 1 and 2 receive the packets. The demodulation section 11 of the transmission/reception section 6 demodulates the received packets (S42). That is, the first and second antennas 1 and 2 receive radio waves in a specified frequency range, carrying the packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8. The synthesizing section 4 synthesizes the first RF signal 7 and the second RF signal 8 and transmits the third RF signal 9 to the transmission/reception section 6. In the transmission/reception section 6, the demodulation section 11 demodulates the third RF signal 9, and confirms the demodulated data. Then, the error detection section 12 detects error location of the data based on the demodulated data (S43).

When the error detection section 12 detects the error location of the data, the received data re-configuring section 13 selects partial data for which the error detection section 12 determines that there are no errors, from partial data of the plurality of transmitted packets, and re-configure a received data stream containing no error by sequentially connecting them together (S44). The error detection of data is performed by the error detection section 12 of the transmission/reception section 6 by using BCH error detection codes as described above. The error detection method is not limited to this. For example, parity check, or CRC (cyclic redundancy check) may be utilized.

Step S42 to step S44 are repeated until the re-configured data contains no error. That is, Step S42 to step S44 are repeated until it is determined at least once that data of all of the data numbers contain no error, in the reception process of the packet of the same content.

In the radio communication device, when the packets are being received in step S42 to step S44, the demodulation section 11 is demodulating the data, and the received data re-configuring section 13 is re-configuring the data, the phase control section 5 causes the phase varying section 3 to vary the phase amount continuously in a cycle satisfying a predetermined condition. As described above, the variation in the phase amount in the phase varying section 3 is set such that the cycle T1 is shorter than the packet length of the received transmitted packet and longer than the cycle of the transmission rate of the communication data, i.e., the relationship of T2<T1<T3 is satisfied.

If it is determined that the re-configured data contains no error ("YES" in S45), the transmission/reception section 6 generates the response packet containing notification information indicating that the data contains no error (no error data notification), and transmits a response packet to a transmission source (S46).

By varying the phase amount in the cycle shorter than the packet length of the transmitted packet and longer than the cycle of the transmission rate of the communication data as described above, the error present in the data of the transmitted packet can be detected by, for example, the BCH error detection code, etc.

Embodiment 5

Figure 20:
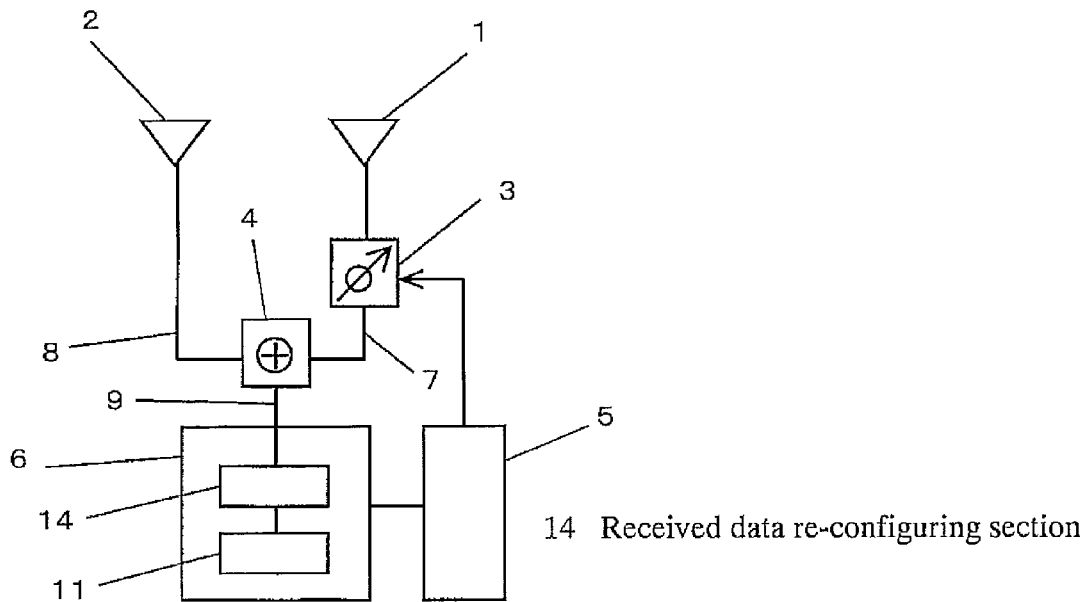
FIG. 20 is a block diagram showing an exemplary configuration of a radio communication device according to Embodiment 5.

In Embodiment 1, 3, and 4, the radio communication device includes the error detection section 12 configured to determine whether or not the data of the received transmitted packet contains an error. In Embodiment 5, a description will be given of a configuration of the radio communication device which includes a reception level detection section (reception level detection means) 14 which detects as a reception level an electric power intensity of a received signal (third RF signal 9) instead of the error detection section 12 and is configured to determine whether or not the data contains an error based on the result of the detection performed by the reception level detection section 14. As shown in FIG. 20, the radio communication device according to Embodiment 5 is different from the radio communication device according to Embodiment 3 in that it does not include the error detection section 12. The radio communication device according to Embodiment 5 is different from the radio communication device according to Embodiment 3 in that it includes the reception level detection section 14 in a previous stage of the demodulation section 11 (at the synthesizing section 4 side rather than the demodulation section 11).

FIG. 20 is a block diagram showing an exemplary configuration of a radio communication device according to Embodiment 5. In FIG. 20, reference symbol 14 designates the reception level detection section. The same components as those of the radio communication device of FIG. 13 are identified by the same reference symbols.

The radio communication device according to Embodiment 5 includes the reception level detection section 14 for detecting the electric power level of the received signal (third RF signal), and therefore can detect the reception level in reception.

T1 is set so as to satisfy a relationship of T3<T1. The reception level detection section 14 is configured as, for example, RSSI circuit.

For example, when the reception level changes as shown in FIG. 14, the reception level detection section 14 of the radio communication device according to Embodiment 5 can detect that the reception level is lowered significantly in reception of the packet transmitted firstly. When the reception level is lowered significantly in this way, a possibility that the received data contains an error is high. It can be determined whether or not the reception level is lowered significantly, on the basis of a reception sensitivity, i.e., a minimum radio wave intensity required to ensure a reception quality necessary for communication.

The radio communication device according to Embodiment 5 discards the packet transmitted firstly and receives the packet re-transmitted (transmitted subsequently).

As shown in FIG. 14, the reception level is not lowered significantly, in reception of the packet which is re-transmitted. When the reception level detection section 14 detects that the reception level is not lowered significantly, the corresponding received data is adopted.

(Reception Process 5 of Packets)

Figure 21:
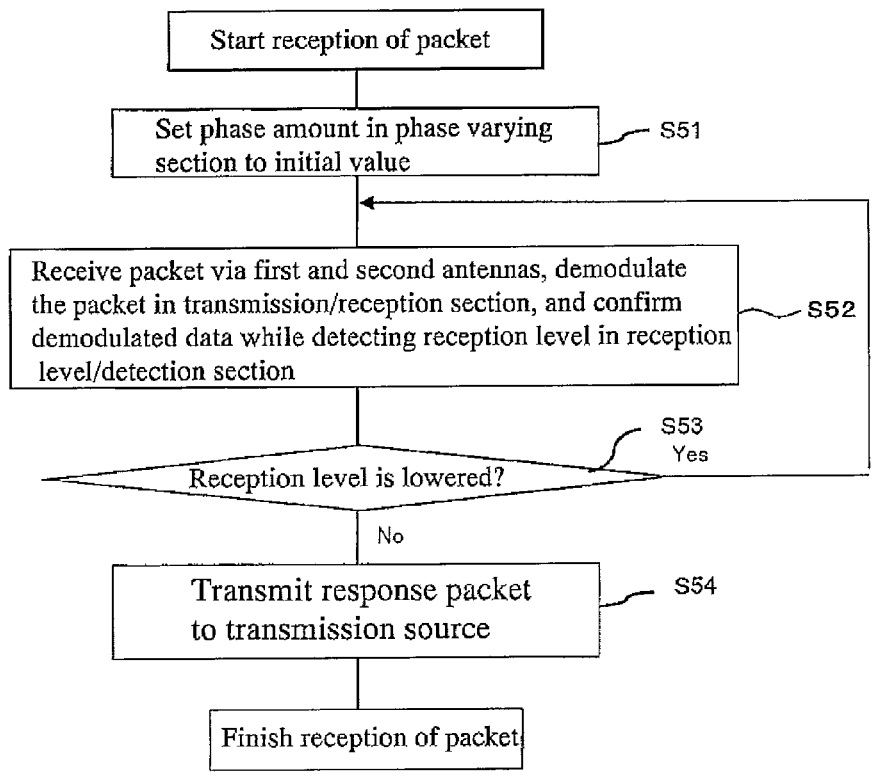
FIG. 21 is a flowchart showing an exemplary packet reception process in the radio communication device according to Embodiment 5.

Next, a description will be given of an operation flow relating to a reception process of packets (transmitted packets) in the radio communication device according to Embodiment 5 with reference to FIG. 21. FIG. 21 is a flowchart showing an exemplary packet (transmitted packet) reception process in the radio communication device according to Embodiment 5.

Initially, the phase control section 5 sets the phase amount in the phase varying section 3 to an initial value (S51). The first and second antennas 1 and 2 receive the transmitted packets. The transmission/reception section 6 demodulates the received transmitted packets. When the transmitted packet is received and demodulated, the reception level detection section 14 detects the reception level (S52).

That is, the first and second antennas 1 and 2 receive radio waves in a specified frequency range, carrying the transmitted packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8.

The synthesizing section 4 synthesizes the first RF signal 7 and the second RF signal 8 and transmits the third RF signal 9 to the transmission/reception section 6. In the transmission/reception section 6, the reception level detection section 14 detects the reception level from the electric power level of the third RF signal, and determines whether or not the reception level is lowered significantly on the basis of the reception sensitivity, and the demodulation section 11 demodulates the third RF signal 9.

In the radio communication device according to Embodiment 5, when the transmitted packets are being received in step S52, the phase control section 5 causes the phase varying section 3 to vary the phase amount continuously in a range satisfying a predetermined condition. As described above, the variation in the phase amount in the phase varying section 3 is set such that the varying cycle T1 is longer than the packet length of the received transmitted packet and satisfies a relationship of T3<T1 (T3=10.2 msec).

When the reception level detection section 14 in the transmission/reception section 6 determines that the reception level is lowered significantly (step S53), step S52 is repeated. That is, when the reception level is lowered significantly, a possibility that the data of the received transmitted packet contains an error is high. Therefore, the packet transmitted subsequently is received and its data is demodulated.

When the reception level detection section 14 determines that the reception level is not lowered significantly in step S53 ("YES" in step S53), the transmission/reception section 6 transmits the response packet to the transmission source (S54).

As described above, since the reception level detection section 14 detects whether or not the reception level is lowered significantly while receiving the transmitted packets, it can be indirectly determined easily whether or not the data of the transmitted packet being received at present contains an error. Therefore, when T1 is set to satisfy the relationship of T3<T1, the radio communication device according to Embodiment 5 can repeat reception of the packet until the level detection section 14 determines that the reception level is not significantly lowered, i.e., the transmitted packet having data which is determined as containing no error is received. Therefore, the radio communication device according to Embodiment 5 can attain data containing no error.

Although the radio communication device according to Embodiment 5 can repeat reception of the packet until the packet for which the reception level detection section 14 determines that its reception level is not significantly lowered is received, the present invention is not limited to this. For example, a plurality of packets having the same content are received, the received packets and results of detection as to the reception levels of the packets which is performed by the reception level detection section 14 are stored such that the packets correspond to the reception levels, respectively. And, a packet corresponding to a highest reception level (e.g., average reception level for a reception period, a maximum value or a minimum value of the reception level for the reception period, etc.) may be selected.

Embodiment 6

In Embodiment 4, the radio communication device includes the error detection section 12 configured to determine whether or not each partial data obtained by dividing the data of the received transmitted packet by predetermined number of bits contains an error. The results of the determination are stored in the memory (not shown) as the table information of FIG. 17. With reference to the table information stored in the memory, the data generated by connecting together the partial data containing no error is adopted as the received data.

Figure 22:
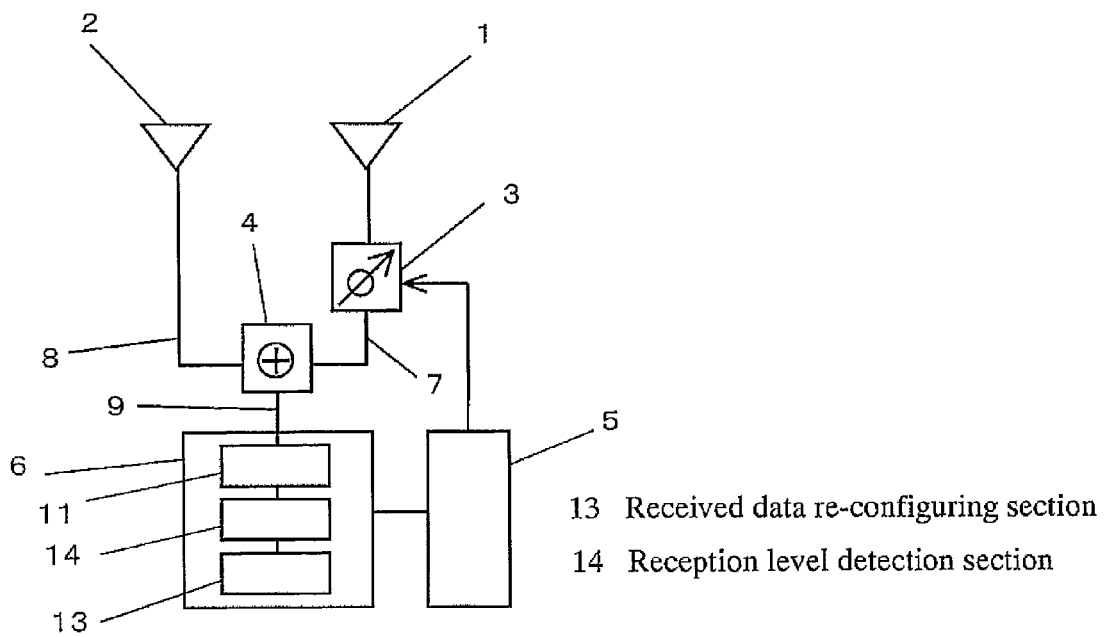
FIG. 22 is a block diagram showing an exemplary configuration of a radio communication device according to Embodiment 6.

In Embodiment 6, a description will be given of a configuration of the radio communication device which includes a reception level detection section 14 for detecting the electric power level of the received signal (third RF signal 9) instead of the error detection section 12 in the configuration of Embodiment 4, and adopts as received data, data generated by connecting together partial data which are higher in the reception level based on the result of the detection performed by the reception level detection section 14, as shown in FIG. 22.

FIG. 22 is a block diagram showing an exemplary configuration of a radio communication device according to Embodiment 6. In FIG. 22, the same components as those of the radio communication device of FIG. 16 are identified by the same reference symbols, and will not be described in repetition.

In the radio communication device according to Embodiment 5, the transmission/reception section 6 further includes the received data re-configuring section 13 in addition to the demodulation section 11, and the reception level detection section 14 for detecting the electric power level of the received signal (third RF signal).

In the present configuration, like the above described Embodiment 5, the error detection section 12 does not directly detect the error of the data, but the reception level detection section 14 determines whether or not the reception level is lowered significantly. More specifically, the reception level detection section 14 monitors whether or not the reception level in reception of each partial data obtained by dividing the data of the transmitted packet by predetermined number of bits is close to a reception sensitivity level or equal to or less than the reception sensitivity level. The monitored results are stored in, for example, the memory in a format similar to the format of the table information of FIG. 17. Further, the reception level detection section 14 monitors which of the partial data corresponds to a highest reception level. The received data re-configuring section 13 re-configures received data containing no error by sequentially connecting together partial data corresponding to the highest reception level.

For example, the reception level detection section 14 monitors whether or not the reception level is close to the reception sensitivity level or equal to or less than the reception sensitivity level, as follows. That is, it is supposed that a level at which the received data contains an error is, for example, a bit error rate (BER)=$10^{-3}$. When a reception sensitivity corresponding to this reception level is −110 dBm, a reception level at which data can be received normally is set to −105 dBm which has an allowance of 5 dBm with respect to −110 dBm. That is, the reception sensitivity level to be monitored is −105 dBm. In this case, 1 dBm is such that electric power of 1 mW is 0 dB. The reception level detection section 14 determines that an error has occurred in a portion of received data (bit stream) corresponding to a detected reception level which is less than −105 dBm. The received data re-configuring section 13 selects partial data which exceed in reception level −105 dBm, from among the corresponding partial data of the received plurality of packets, and re-configure data by connecting them together. It can be determined whether or not the reception level is lowered significantly in step S52 of Embodiment 5, by a process similar to the process for the determination as to whether or not the reception level is equal to or less than the reception sensitivity level.

(Reception Process 6 of Packets)

Figure 23:
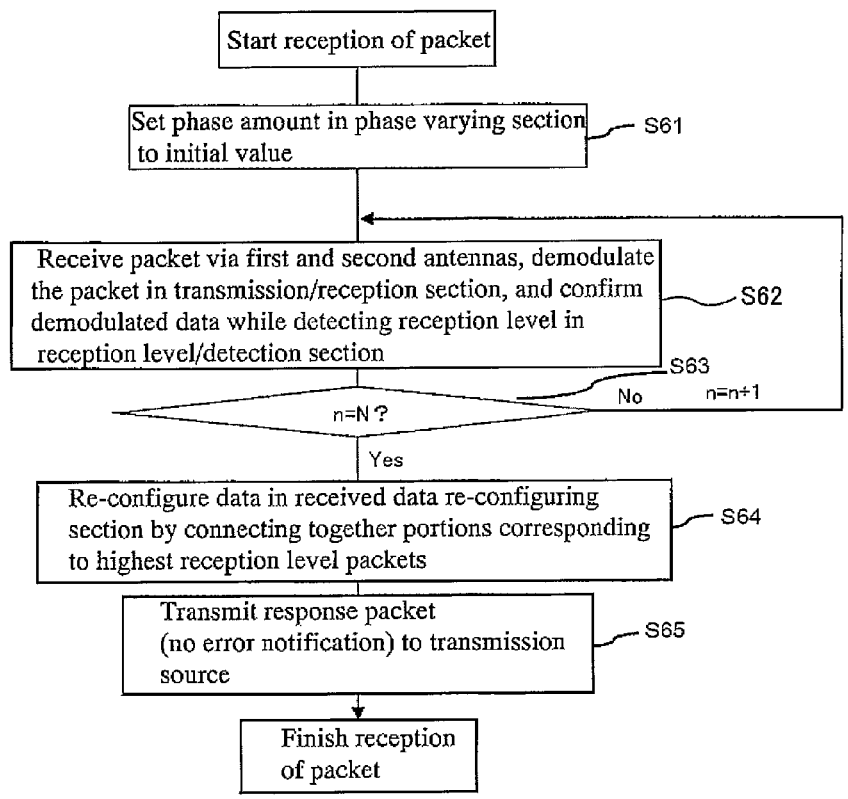
FIG. 23 is a flowchart showing an exemplary packet reception process in the radio communication device according to Embodiment 6.

Next, a description will be given of an operation flow relating to a reception process 6 of packets (transmitted packets) in the radio communication device according to Embodiment 6, with reference to FIG. 23. FIG. 23 is a flowchart showing an exemplary packet reception process in the radio communication device according to Embodiment 6.

Initially, the phase control section 5 sets the phase amount in the phase varying section 3 to an initial value (S61). The first and second antennas 1 and 2 receive the transmitted packets. The transmission/reception section 6 demodulates the received transmitted packets. When the transmitted packets are received and demodulated, the reception level detection section 14 detects the reception level while monitoring whether or not the reception level of each partial data obtained by dividing the data of the transmitted packet by predetermined number of bits is close to a reception sensitivity level or equal to or less than the reception sensitivity level (S62).

That is, in the radio communication device according to Embodiment 6, the first and second antennas 1 and 2 receive radio waves in a specified frequency range, carrying the transmitted packets. The first antenna 1 sends the received radio wave to the synthesizing section 4 as the first RF signal 7 via the phase varying section 3. By comparison, the second antenna 2 sends the received radio wave to the synthesizing section 4 as the second RF signal 8.

The synthesizing section 4 synthesizes the first RF signal 7 and the second RF signal 8 and transmits the third RF signal 9 to the transmission/reception section 6.

In the transmission/reception section 6, the reception level detection section 14 detects the reception level, and determines whether or not the reception level is lowered to a level which is close to the predetermined reception sensitivity level, or equal to or less than the predetermined reception sensitivity level, and the demodulation section 11 demodulates the third RF signal.

In the radio communication device, when the transmitted packets are being received in step S62, the phase control section 5 causes the phase varying section 3 to vary the phase amount continuously in a range satisfying a predetermined condition.

The radio communication device according to Embodiment 6 is configured to receive transmitted packets having the same content a predetermined number of times (N times), and store in the memory data of the transmitted packets. The transmission/reception section 6 determines whether or not the data of the transmitted packets of N times have been received (S63). If it is determined that the data of the transmitted packets of N times have been received ("YES" in S63), the received data re-configuring section 13 re-configures data based on the data stored in the memory. The received data re-configuring section 13 searches partial data corresponding to a higher reception level in the reception, and re-configures data by connecting together partial data obtained by the search (S64).

When the re-configuration of the data is completed, the transmission/reception section 6 transmits a response packet to a transmission source (S65).

As described above, since the reception level detection section 14 monitors whether or not the reception level is lowered to the level equal to or less than the predetermined reception sensitivity level, while receiving the transmitted packets, it can be indirectly determined whether or not the partial data of the received packet contains an error. In addition, most favorable partial data in which its reception level in reception is higher than the predetermined reception sensitivity level are selected and connected together, thereby attaining data containing no error.

Embodiment 7

In Embodiment 1 described above, the phase varying section 3 is configured to vary the phase amount depending on whether or not the data of the received transmitted packet contains an error. In Embodiment 2 to Embodiment 6, the phase varying section 3 is configured to vary the phase amount in a range satisfying the predetermined condition. Hereinafter, a description will be given of Embodiment 7 in which a radio communication device is configured such that transmitted packets are received in a state in which a phase amount corresponding to a highest reception level is fixed, with reference to FIG. 24.

Figure 24:
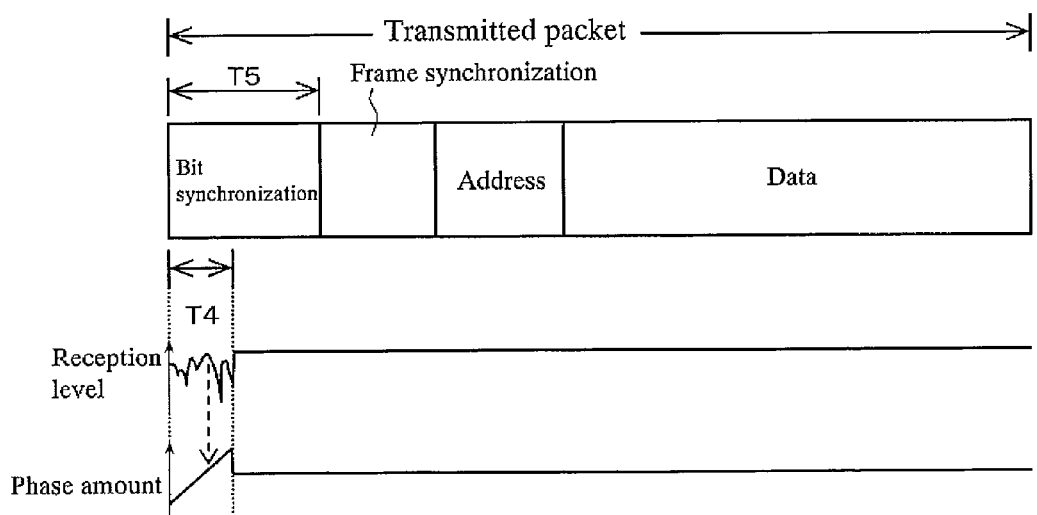
FIG. 24 is a view showing a transmitted packet, a variation in a phase amount which is caused by the phase varying section and a change in a reception level in a radio communication device according to Embodiment 7.

FIG. 24 is a view showing a transmitted packet, a variation in a phase amount which is caused by the phase varying section and a change in a reception level in the radio communication device according to Embodiment 7.

The radio communication device according to Embodiment 7 has a configuration similar to that (see FIG. 20) of the radio communication device according to Embodiment 5, and the components will not be described in repetition.

In the radio communication device according to Embodiment 7, as shown in FIG. 24, the phase control section 5 causes the phase varying section 3 to vary the phase amount during a period of a time length T4 after reception of the transmitted packet starts (FIG. 24 illustrates an example in which the phase amount is increased monotonously). At this time, the reception level detection section 14 monitors the reception level. The phase amount in the phase varying section 3, which corresponds to the highest reception level, is stored. The phase control section 5 causes the phase varying section 3 to fix the stored phase amount.

After T4, the reception operation continues in a state in which the phase amount in the phase varying section 3 is fixed.

T4 is set so as to satisfy a relationship of T4<T5 which is a time length T5 of a bit synchronization signal (header information) which is at a head of a transmitted packet to be received.

This makes it possible to decide an optimal phase amount when the reception of the bit synchronization signal continues, and receive the frame synchronization signal subsequent to the bit synchronization signal and the following signals in the highest reception level.

(Reception Process 7 of Packets)

Figure 25:
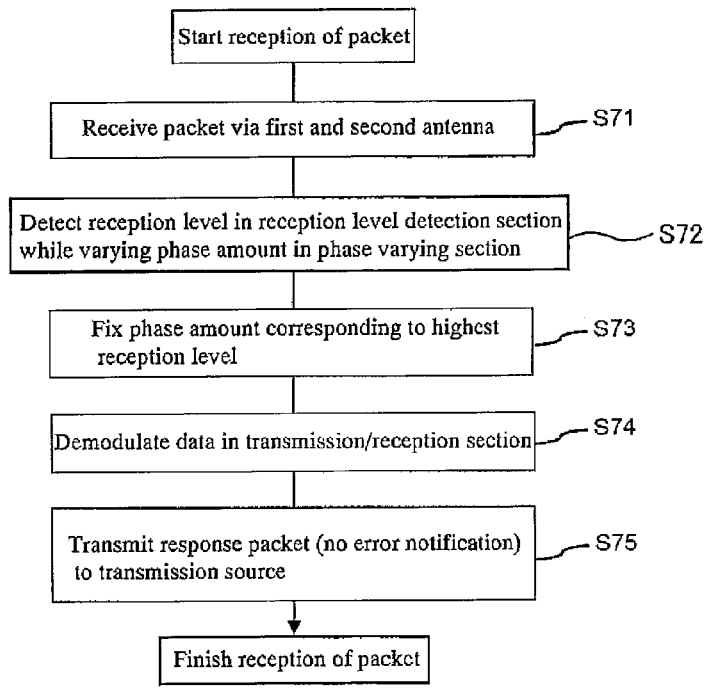
FIG. 25 is a flowchart showing an exemplary packet reception process in the radio communication device according to Embodiment 7.

Next, a description will be given of an operation flow relating to a reception process 7 of packets (transmitted packets) in the radio communication device according to Embodiment 7, with reference to FIG. 25. FIG. 25 is a flowchart showing an exemplary packet reception process in the radio communication device according to Embodiment 7.

Each of the first and second antennas 1 and 2 receives a bit synchronization signal portion of transmitted packet (S71). At this time, while receiving the transmitted packet (bit synchronization signal portion), the phase control section 5 causes the phase varying section 3 to vary the phase amount and the reception level detection section 14 detects the reception level (S72). In this way, the phase amount is varied and a relationship between the phase amount and the reception level is searched. The phase control section 5 fixes the phase amount corresponding to the highest reception level (S73). In the state where the phase amount is fixed, each of the first and second antennas 1 and 2 continues to receive a data portion following the bit synchronization signal portion in the transmitted packet. The demodulation section 11 of the transmission/reception section 6 demodulates the received data portion (S74).

That is, the phase control section 5 causes the phase varying section 3 to fix the phase amount set in step S73, and each of the first and second antennas 1 and 2 continues to receive the data portion of the transmitted packet.

After the data portion of the transmitted packet continues to be received with the phase amount set in step S73, and demodulation of the received data portion is completed, the transmission/reception section 6 transmits a response packet to a transmission source (S75).

As described above, prior to receiving the data portion of the transmitted packet, i.e., in the middle of the reception of the bit synchronization signal, the phase control section 5 causes the phase varying section 3 to vary the phase amount, and causes the phase varying section 3 to fix the phase amount corresponding to the highest reception level determined by the reception level detection section 14. Furthermore, reception of the packet data is carried out in a state in which the phase amount corresponding to the highest reception level is fixed. Because of this, the radio communication device according to Embodiment 7 is capable of receiving the data portion of the packet in a preset good reception state.

Embodiment 8

Figure 26:
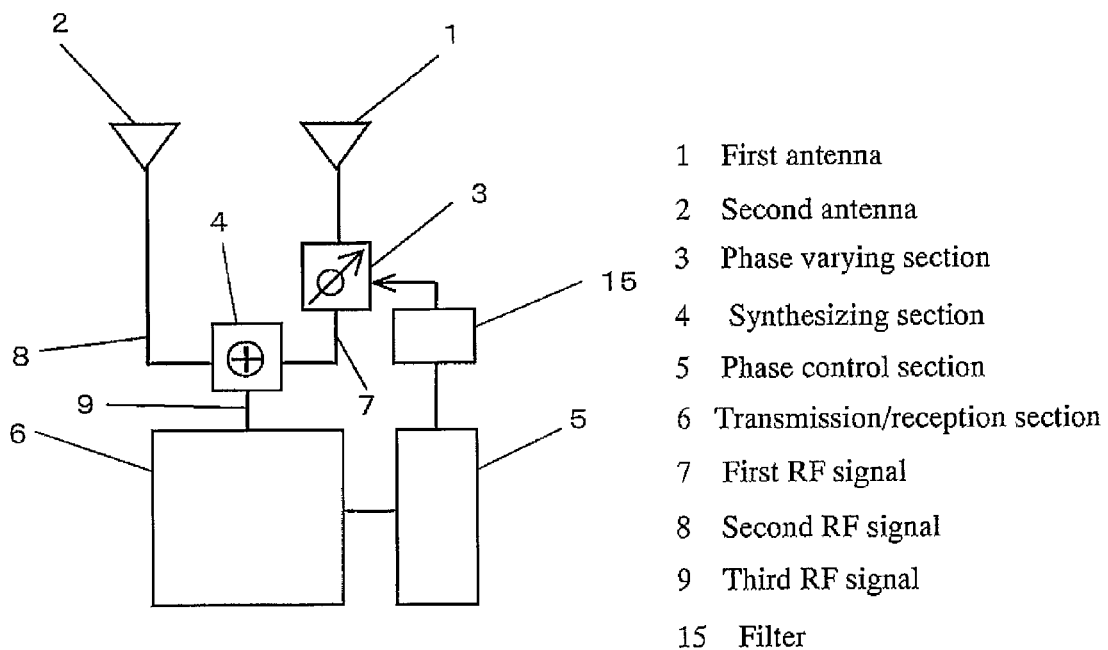
FIG. 26 is a block diagram showing an exemplary configuration of a radio communication device according to Embodiment 8.

Next, a radio communication device according to Embodiment 8 will be described with reference to FIG. 26. FIG. 26 is a block diagram showing an exemplary configuration of the radio communication device according to Embodiment 8. As shown in FIG. 26, the radio communication device according to Embodiment 8 is different from the configuration of the radio communication device according to Embodiment 1 in that the radio communication device according to Embodiment 8 further includes a filter 15.

The radio communication device according to Embodiment 8 is different from the radio communication devices according to another embodiments in that a signal of a control signal output terminal of the phase control section 5 is connected to a control signal input terminal of the phase varying section 3 via the filter 15. The radio communication device according to Embodiment 8 has the same configuration as that of the radio communication device according to Embodiment 1 except for the filter 15. The components other than the filter 15 are designated by the same reference symbols as those of the radio communication device according to Embodiment 1, and will not be described in repetition.

Figure 27:
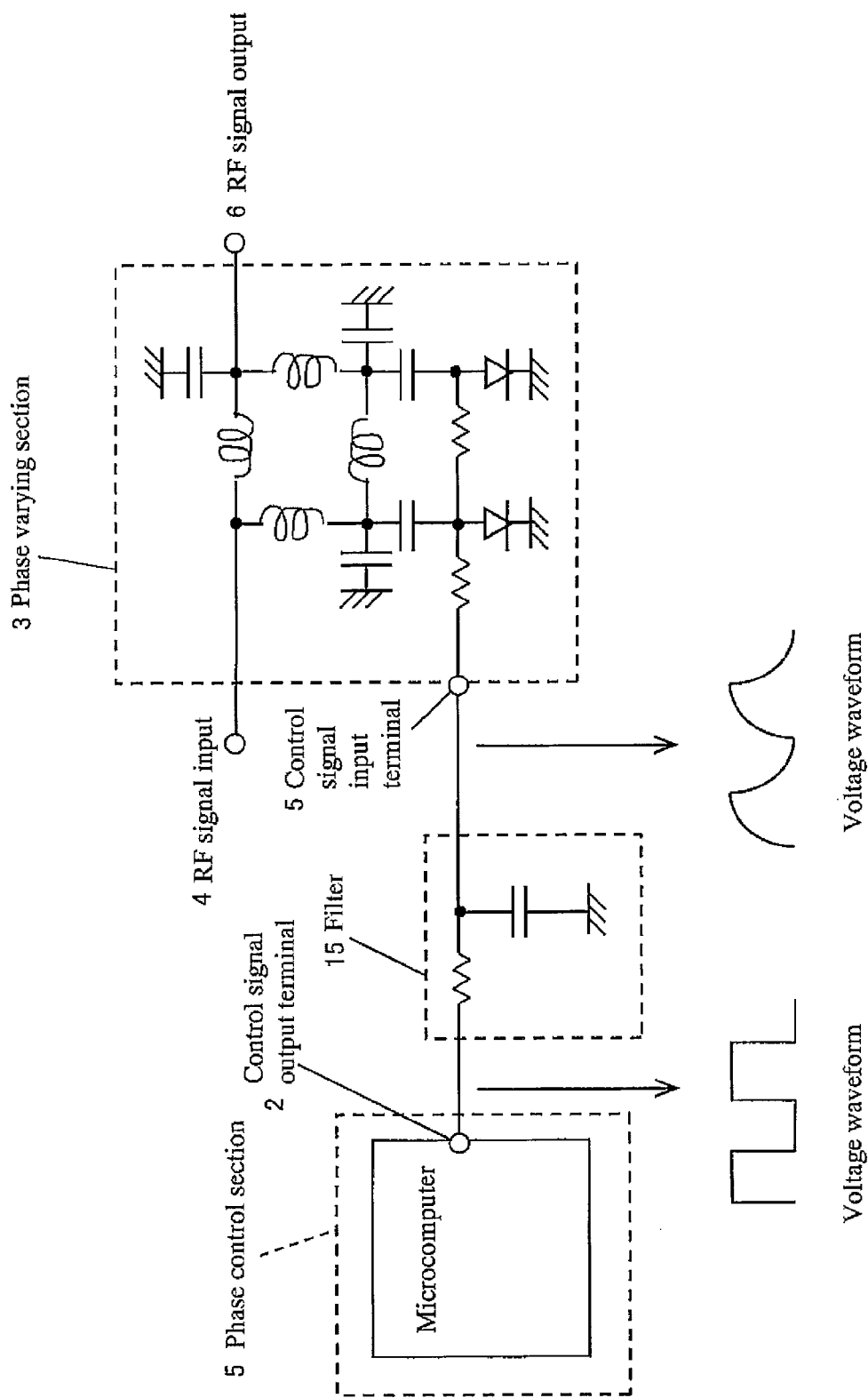
FIG. 27 is a view showing a specific configuration of a portion in the vicinity of a filter in the radio communication device according to Embodiment 8.

The filter 15 will now be described with reference to FIG. 27. FIG. 27 is a view showing an exemplary specific configuration of a portion in the vicinity of the filter 15 in the radio communication device according to Embodiment 8.

The radio communication device is configured such that the phase control section 5 outputs a control signal to the phase varying section 3. In the radio communication device according to Embodiment 8, the filter 15 is provided in a portion of a transmission path of the control signal. As shown in FIG. 27, the phase control section 5 is constituted by a microcomputer, and an output terminal of the microcomputer is the control signal output terminal. The control signal output from the microcomputer is a square waveform and is input to the filter 15. The filter 15 is constituted by a CR filter. The control signal input from the microcomputer is input to the control signal input terminal of the phase varying section 3 via the filter 15. As shown in FIG. 27, a voltage waveform of the control signal output from the filter 15 to the control signal input terminal is a quasi-triangular waveform.

As shown in FIG. 27, the phase varying section 3 is configured such that variable capacitance diodes are connected to 90-degree hybrid circuit of lumped constant type. By changing a voltage applied to the variable capacitance diodes, the phase amount in the phase varying section 3 can be varied.

To vary the phase amount linearly with respect to time, it is necessary to input a triangular-waveform control signal. The square waveform output from the microcomputer is caused to pass through the filter 15 in the radio communication device according to Embodiment 8 and converted into the control signal of the quasi-triangular waveform. The filter 15 in the radio communication device according to Embodiment 8 has an advantage that it can be configured as a very simple circuit such as the CR filter. As described above, in the radio communication device according to Embodiment 8, the filter 15 converts the square waveform of the voltage waveform of the control signal output from the phase control section 5 into the quasi-triangular waveform and outputs the quasi-triangular waveform to the phase varying section 3. This enables the phase varying section 3 to vary the phase amount linearly with respect to time.

Embodiment 9

In Embodiment 1 to Embodiment 8 as described above, the phase varying section 3 varies the phase amount of the RF signal received by the first antenna in response to the control command issued from the phase control section 5, and thus lowering of the reception level is avoided. Hereinafter, instead of providing the phase varying section 3 configured to vary the phase amount, lowering of the reception level is avoided by varying a dividing ratio of the electric power between the RF signal (first RF signal 7) output from the first antenna 1 and the RF signal (second RF signal 8) output from the second antenna 2.

Figure 28:
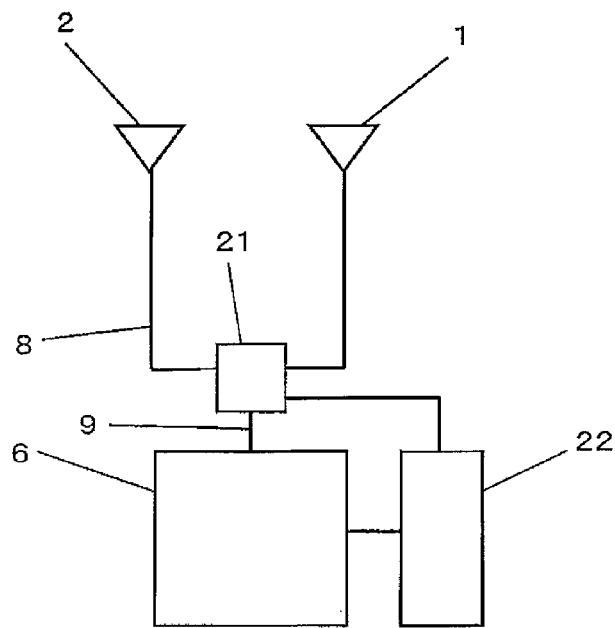
FIG. 28 is a block diagram showing an exemplary schematic configuration of a radio communication device according to Embodiment 9.

As shown in FIG. 28, the radio communication device according to Embodiment 9 includes a dividing ratio control section 22 instead of the phase varying section 3 and the phase control section 5 in the radio communication device according to Embodiment 1 of FIG. 1. In addition, the radio communication device according to Embodiment 9 includes a variable dividing section (variable dividing means) 21 instead of the synthesizing section 4. FIG. 28 is a block diagram showing an exemplary schematic configuration of the radio communication device according to Embodiment 9. In FIG. 28, the same components as those of the radio communication device of FIG. 1 are identified by the same reference symbols, and will not be described in repetition.

Figure 29:
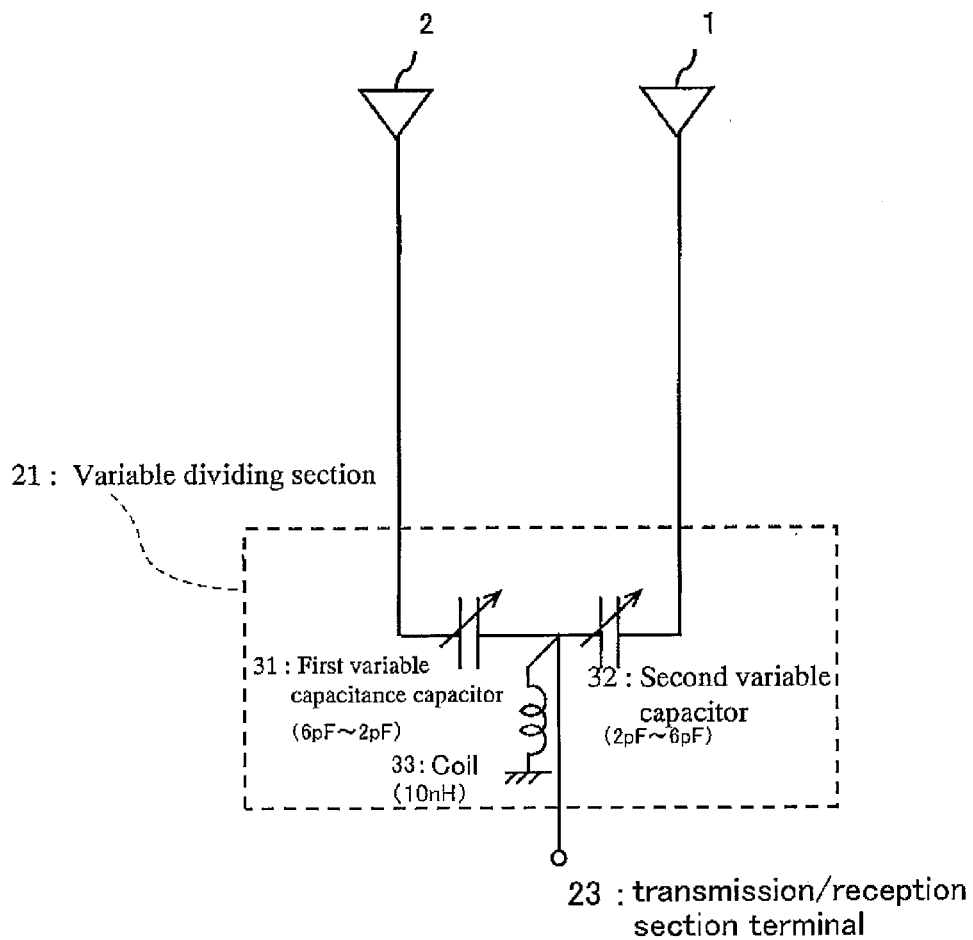
FIG. 29 is a view showing an exemplary circuit configuration of a variable dividing section in the radio communication device according to Embodiment 9.

More specifically, the variable dividing section 21 in the radio communication device according to Embodiment 9 is configured as shown in FIG. 29. FIG. 29 is a view showing an exemplary circuit configuration of the variable dividing section 21 in the radio communication device according to Embodiment 9. The variable dividing section 21 is capable of dividing a RF signal input through a transmission/reception section terminal 23 and outputting divided signal portions to the first antenna 1 and to the second antenna 2. Conversely, the variable dividing section 21 is capable of synthesizing input RF signals from the first antenna 1 and the second antenna 2 and outputting the synthesized signal to the transmission/reception section 6 through the transmission/reception section terminal 23.

The other end of a circuit having the transmission/reception section terminal 23 at one end branches toward the first antenna 1 and the second antenna 2. A first variable capacitor 31 is provided in the circuit connected to the first antenna 1, while a second variable capacitor 32 is provided in the circuit connected to the second antenna 2. By varying a capacitance of the first variable capacitor 31 and a capacitance of the second variable capacitor 32, the dividing ratio of the electric power between the first antenna 1 side and the second antenna 2 side can be changed.

At a branch point at which the circuit branches toward the first antenna and the second antenna, a coil 33 is provided to adjust impedance matching. An inductance of the coil 33 is 10 nH. One end of the coil 33 is connected to the branch point and the other end of thereof is electrically grounded.

In the radio communication device according to Embodiment 9, for example, the electric power supplied to the first antenna 1 and the electric power supplied to the second antenna 2 are varied, as described below. For example, if the capacitance of each of the first variable capacitor 31 and the second variable capacitor 32 varies from 2 pF to 6 pF, the capacitance of the first variable capacitor 31 is varied from 6 pF to 2 pF in response to a control command issued from the dividing ratio control section 22.

Figure 30:
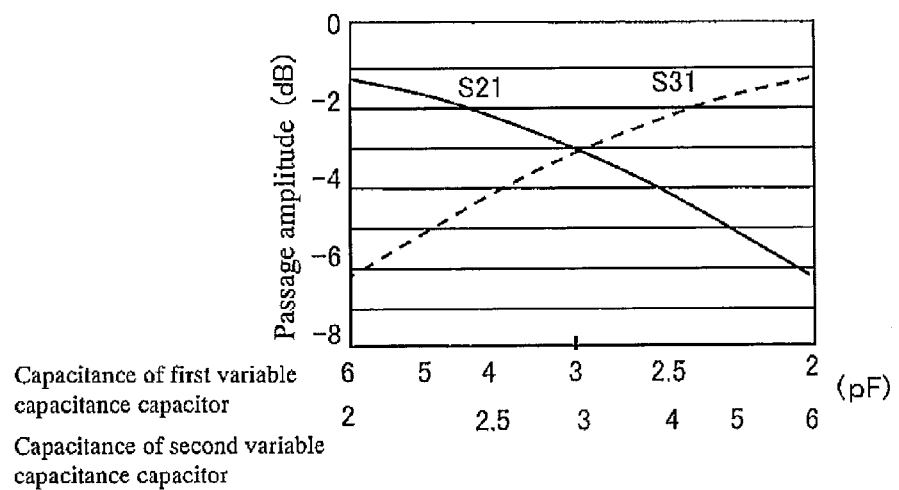
FIG. 30 is a graph showing a relationship between capacitances of a first variable capacitor and of a second variable capacitor in the radio communication device according to Embodiment 9, and a passage amplitude in the circuit.
Figure 31:
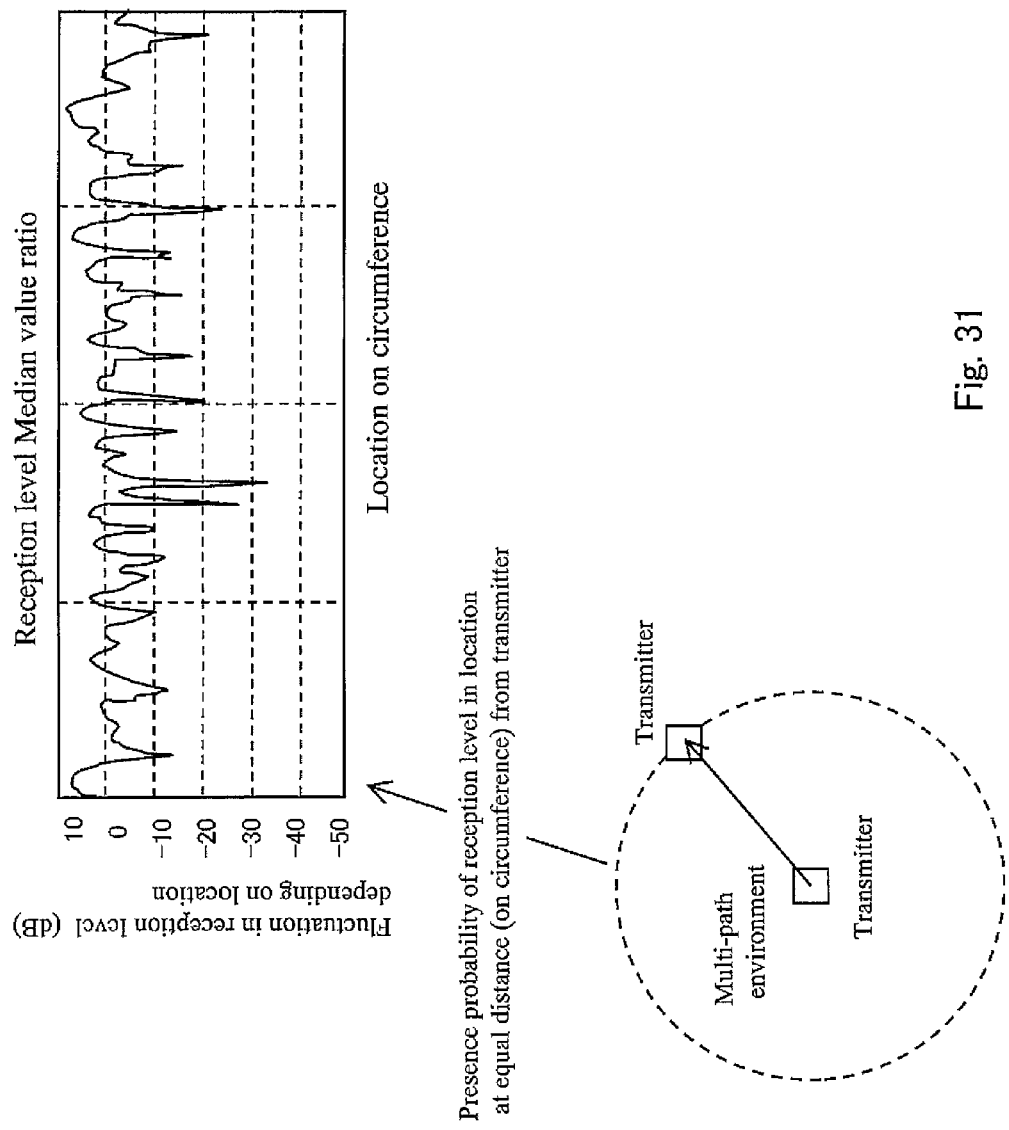
FIG. 31 is a view showing a transmitter provided in a multi-path environment and a fluctuation (change) in a reception electric field level in a receiver provided (on a circumference) at an equal distance from the transmitter.

At this time, the capacitance of the second variable capacitor 32 is varied from 6 pF to 2 pF along with the variation in the capacitance of the first variable capacitor 31. FIG. 30 shows a relationship between the capacitance of the first variable capacitor 31 and a passage amplitude (dB) of the RF signal transmitted in the circuit, and a relationship between the capacitance of the second variable capacitor 32 and a passage amplitude (dB) of the RF signal transmitted in the circuit, in this case. FIG. 30 is a graph showing the relationship between the capacitance of the first variable capacitor 31 in the radio communication device of Embodiment 9 and the passage amplitude of the signal voltage, and the relationship between the capacitance of the second variable capacitor 32 in the radio communication device of Embodiment 9 and the passage amplitude of the signal voltage. In FIG. 30, S21 indicates the relationship between the capacitance of the first variable capacitor 31 and the passage amplitude, while S31 indicates the relationship between the capacitance of the second variable capacitor 32 and the passage amplitude. As shown in FIG. 30, when the capacitance of one of the first and second variable capacitors is made greater, the capacitance of the other of the first and second variable capacitors is made smaller correspondingly, to cause the first and second variable capacitors to operate so that the impedance when viewed from the transmission/reception section terminal 23 is not changed, i.e., impedance mismatching will not occur.

As shown in FIG. 30, when the capacitance of the first variable capacitor 31 is 6 pF and the capacitance of the second variable capacitor 32 is 2 pF, the electric power is divided such that the ratio between the electric power of the first antenna 1 and the electric power of the second antenna 2 is 3:1. For example, in the example of FIG. 30, when the capacitance of the first variable capacitor 31 is 6 pF and the capacitance of the second variable capacitor 32 is 2 pF, S21=−1.2 dB and S31=−6 dB. Since −1.2 dB=electric power 0.76 times and −6 dB=electric power 0.25 times, 0.76:0.25, and the electric power ratio is about 3:1. Then, when the capacitance of the first variable capacitor 31 and the capacitance of the second variable capacitor 32 are each varied into 3 pF, the electric power is divided such that the ratio between the electric power of the first antenna 1 and the electric power of the second antenna 2 is 1:1. When the capacitance of the first variable capacitor 31 is 2 pF and the capacitance of the second variable capacitor 32 is 6 pF, the electric power is divided such that the ratio between the electric power of the first antenna 1 and the electric power of the second antenna 2 is 1:3. That is, the relationship in the case where the capacitance of the first variable capacitor 31 is 2 pF and the capacitance of the second variable capacitor 32 is 6 pF is the reverse of the relationship in the case where the capacitance of the first variable capacitor 31 is 6 pF and the capacitance of the second variable capacitor 32 is 2 pF.

As described above, by varying the dividing ratio of the electric power between the first antenna 1 and the second antenna 2, a result which is a sum of the RF signal received by the first antenna and the RF signal received by the second antenna is changed, thereby mitigating cancellation of the radio waves due to fading. In other words, it becomes possible to avoid that the reception level is lowered significantly.

Although in Embodiment 1 to Embodiment 9 as described above, the description has been mainly given of the case where the radio communication device operates as the radio communication device at the reception side, the same occurs when the radio communication device operates as a radio communication device at a transmission side. That is, in the case where the radio communication device operates as the radio communication device at the transmission side, it becomes possible to avoid that the reception level is lowered significantly and the packets cannot be received correctly in the radio communication device at a transmission destination, by providing the configuration in which the phase amount of the RF signal output from the first antenna 1 is varied or the dividing ratio of the electric power between the first antenna 1 and the second antenna 2 is varied.

As should be appreciated from the above, the radio communication device of the present invention is configured as described below.

The radio communication device of the present invention includes a first antenna, a second antenna, a phase varying means which varies a phase of a RF signal received by or transmitted from the first antenna, and a phase control means which causes the phase varying means to vary a phase amount which is a varied amount of the phase of the RF signal received by or transmitted from the first antenna.

The radio communication device of the present invention can achieve advantages that it is possible to avoid an increase in the size of the device configuration and lowering of a reception electric field level in a localized area.

In the radio communication device of the present invention, the phase control means may cause the phase varying means to vary the phase amount repetitively in fixed cycles, and the phase control means may cause the phase varying means to vary the phase amount of the RF signal such that a relationship of T1<T2 is satisfied, when a cycle in which the phase amount is varied is T1, and a 1-bit time length which is a time length required to transmit 1 bit of data transmitted and received in a state in which the data is incorporated in the RF signal is T2.

In accordance with this configuration, in the radio communication device of the present invention, the phase control means is able to cause the phase varying means to vary the phase amount such that the relationship of T1<T2 is satisfied.

The reception level indicating an intensity of the RF signal received by each of the first antenna and the second antenna changes as the phase amount is varied, and therefore changes in a time shorter than the cycle T1 in which the phase amount is changed repetitively. Because of this, even when the reception level is lowered, its duration is much shorter than the 1-bit time length of the data. As a result, demodulated data contains no error.

Thus, in the radio communication device of the present invention, it is possible to avoid lowering of the reception level in a localized area merely by varying the phase amount repetitively in fixed cycles such that the relationship of T1<T2 is satisfied.

The radio communication device of the present invention may be configured to receive packet data having the same content repetitively via the first antenna and the second antenna, and may comprise a synthesizing means which synthesizes the RF signal containing the packet data received by the first antenna and the RF signal containing the packet data received by the second antenna, a demodulation means which demodulates the RF signal synthesized by the synthesizing means to generate the packet data, and an error detection means which detects whether or not the packet data generated by the demodulation means contains an error, wherein when the error detection means detects that the packet data contains an error, the packet data determined as containing the error may be discarded and the error detection means may detect whether or not packet data generated by the demodulation means subsequently to the packet data containing the error contains an error.

In accordance with this configuration, since the synthesizing means and the demodulation means allow the RF signal received by the first antenna and the second antenna to be demodulated to generate the packet data. In addition, since the error detection means can detect whether or not the generated packet data contains an error, it becomes possible to confirm whether or not packet data transmitted subsequently contains an error, if it is detected that the generated packet contains the error.

In this way, it can be detected whether or not the packet data contains an error until the packet data containing no error is attained.

Note that the packet data having the same content which is received repetitively may be a plurality of packet data transmitted successively at predetermined intervals from a transmission source, or may be packet data transmitted to the radio communication device of the present invention from the transmission source in response to a request made by the radio communication device to the transmission source when the error detection means detects that the packet data contains the error.

The radio communication device of the present may be configured to receive a plurality of packet data having the same content repetitively via the first antenna and the second antenna, and may comprise a synthesizing means which synthesizes the RF signal containing the packet data received by the first antenna and the RF signal containing the packet data received by the second antenna, a demodulation means which demodulates the RF signal synthesized by the synthesizing means to sequentially generate the packet data, an error detection means which detects whether or not partial data obtained by dividing the packet data generated by the demodulation means by predetermined number of bits contains an error and stores partial data containing no error in respective packet data, and a re-configuring means which re-configures the packet data by connecting together partial data containing no error which are stored by the error detection means, among the corresponding partial data of the plurality of packet data.

In accordance with this configuration, the synthesizing means and the demodulation means allow the RF signal received by the first antenna and the second antenna to be demodulated to generate the packet data.

In addition, the error detection means can detect whether or not each partial data constituting the generated packet data contains an error, and store the partial data containing no error.

Furthermore, the re-configuring means can re-configure the packet data by connecting together the partial data containing no error which are stored, thereby generating the packet data containing no error. Therefore, in the case where the plurality of packet data having the same content are transmitted successively, the packet data containing no error is attained even when a portion of each received packet data surely contains an error.

The radio communication device of the present invention may be configured to receive a plurality of packet data having the same content via the first antenna and the second antenna, and may comprise a synthesizing means which synthesizes the RF signal containing the packet data received by the first antenna and the RF signal containing the packet data received by the second antenna, a demodulation means which demodulates the RF signal synthesized by the synthesizing means to sequentially generate the packet data, and a reception level detection means which detects a reception level indicated by an electric power intensity of the synthesized RF signal in reception of the packet data generated by the demodulation means, and packet data corresponding to a highest reception level detected by the reception level detection means may be selected as received data.

In accordance with this configuration, the synthesizing means and the demodulation means allow the RF signal received by the first antenna and the second antenna to be demodulated to generate the packet data.

In addition, the reception level detection means can detect the reception level in the reception of the packet data generated by the demodulation means. This makes it possible to confirm whether or not the generated packet data is packet data received in a good reception level. A possibility that packet data received in a low reception level contains an error is high. In the radio communication device of the present invention, since the packet data corresponding to the highest reception level is selected as received data, packet data which is least likely to contain an error, among the demodulated packet data, can be selected as the received data.

The radio communication device of the present invention may be configured to receive a plurality of packet data having the same content via the first antenna and the second antenna, and may comprise a synthesizing means which synthesizes the RF signal containing the packet data received by the first antenna and the RF signal containing the packet data received by the second antenna, a demodulation means which demodulates the RF signal synthesized by the synthesizing means to sequentially generate the packet data, a reception level detection means which detects a reception level indicated by an electric power intensity of the synthesized RF signal, when each of partial data obtained by dividing the packet data generated by the demodulation means by predetermined number of bits constituting the packet data is received, and stores the partial data and the reception level such that the partial data corresponds to the reception level, and a re-configuring means which re-configures the packet data by connecting together partial data corresponding to the highest reception level, which are stored by the reception level detection means, among the corresponding partial data of the plurality of packet data.

In accordance with this configuration, the synthesizing means and the demodulation means allow the RF signal received by the first antenna and the second antenna to be demodulated to generate the packet data.

In addition, the reception level detection means can detect the reception level in the reception of each of partial data of the packet data generated by the demodulation means. This makes it possible to confirm whether or not the partial data is partial data which has been received in a good reception level.

Furthermore, the re-configuring means can select partial data corresponding to the highest reception level from among the corresponding partial data of the plurality of packet data and re-configure the packet data by connecting them together.

A possibility that partial data received in a low reception level contains an error is high. In the radio communication device of the present invention, packet data is generated by connecting together partial data corresponding to the highest reception level, and thus packet data which is least likely to contain an error can be made as the received data.

The radio communication device of the present invention may comprise a synthesizing means which synthesizes the RF signal containing the packet data received by the first antenna and the RF signal containing the packet data received by the second antenna, a demodulation means which demodulates the RF signal synthesized by the synthesizing means to generate the packet data, and a reception level detection means which detects a reception level indicated by an electric power intensity of the synthesized RF signal, the packet data generated by the demodulation means may be composed of a header information portion and a data portion; the phase control means may cause the phase varying means to vary a phase of the RF signal received by the first antenna during a period in which the header information portion of the packet data is received, and the phase control means may cause the phase varying means to fix a phase amount corresponding to a highest reception level in reception of the header information portion, based on a result of the detection performed by the reception level detection means, during a period in which the data portion of the packet data is received.

In accordance with this configuration, the synthesizing means and the demodulation means allow the RF signal received by the first antenna and the second antenna to be demodulated to generate the packet data.

In addition, the reception level detection means can detect the reception level in the reception of the header information portion of the packet data generated by the demodulation means. Since the phase control means causes the phase varying means to vary the phase amount in the reception of the header information portion, the reception level in the reception of the header information portion is varied. Then, the phase control means selects the phase amount corresponding to the highest reception level and fixes the phase amount corresponding to the highest reception level.

Because of this, when the data portion of the packet data is received, this data portion can be received in the highest reception level.

In the radio communication device of the present invention, the phase varying means may be configured to vary the phase amount in response to a voltage input to a control signal input terminal of the phase varying means, and a voltage changing cyclically or randomly which is output from a control signal output terminal of the phase control means may be input to the control signal input terminal.

In the radio communication device of the present invention, a control signal of the phase control means may have a square waveform, and the control signal having the square waveform may be input to the control signal input terminal of the phase varying means via a filter.

To achieve the above described object, a radio communication device of the present invention comprises a first antenna, a second antenna, and a dividing ratio control means which varies a dividing ratio between electric power of the RF signal received by or transmitted from the first antenna and electric power of the RF signal received by or transmitted from the second antenna.

Therefore, the radio communication device of the present invention can achieve advantages that an increase in a size of a device configuration can be prevented, and lowering of a reception electric field level in a localized area can be avoided.

The radio communication device of the present invention may be configured as follows.

A radio communication device according to a first aspect to the present invention comprises a first antenna, a second antenna, a phase varying means, a synthesizing means, a phase control means, and a transmission/reception means, the synthesizing means synthesizes a first RF signal obtained by inputting a RF signal received by the first antenna to the phase varying means and a second RF signal received by the second antenna to generate a third RF signal and inputs the third RF signal to the transmission/reception means, and the phase control means causes the phase varying means to repetitively vary a phase amount cyclically or randomly in a reception operation or in a transmission operation. This makes it possible to vary the phase so that cancellation of electric field levels due to fading under a multi-path environment will not occur. As a result, lowering of the reception electric field level in a localized area can be avoided.

In a radio communication device according to a second aspect of the present invention, in the first aspect, a cycle T1 in which the phase control means causes the phase varying means to vary the phase amount repetitively and a cycle T2 of a transmission rate of communication data satisfy a relationship of T1<T2. In accordance with this, since a duration in which the reception level is lowered is much shorter than the cycle T2 of the transmission rate, no error occurs in received demodulated data. That is, merely by varying the phase in the radio communication device at the transmission side or at the reception side continuously, it becomes possible to realize communication which can avoid that the reception level is lowered in a localized area.

A radio communication device according to a third aspect of the present invention, in the first aspect, further comprises a demodulation means and an error detection means, wherein a cycle T1 in which the phase control means causes the phase varying means to vary the phase amount repetitively and a communication packet length T3 satisfy a relationship of T3<T1, the demodulation means demodulates a plurality of packets which are transmitted and received repetitively, the error detection means detects whether or not each transmitted packet data demodulated by the demodulation means contains an error, and packet data containing no error is obtained as received data. In accordance with this, even if demodulated data of a packet transmitted firstly contains an error, a packet re-transmitted (transmitted subsequently) is received, thereby avoiding that the reception level is lowered in a localized area.

A radio communication device according to a fourth aspect of the present invention, in the first aspect, may comprise a demodulation means, an error detection means and a received data re-configuring means, wherein a cycle T1 in which the phase control means causes the phase varying means to vary the phase amount repetitively, a cycle T2 of a transmission rate of communication data, and a communication packet length T3 satisfy a relationship of T2<T1<T3, the demodulation means demodulates a plurality of packets which are transmitted and received repetitively, the error detection means detects whether or not each partial data of the transmitted packet data which is demodulated by the demodulation means contains an error, and the received data re-configuring means re-configures transmitted packet data by connecting together partial data of transmitted packets which are determined as containing no error by the error detection means. In accordance with this, even if a portion of the demodulated data of the packet transmitted firstly contains an error, the packet re-transmitted (transmitted subsequently) is received and portions containing no error are connected together, thereby receiving a correct data stream, and avoiding that the reception level is lowered in a localized area.

A radio communication device according to a fifth aspect of the present invention, in the first aspect, further comprises a demodulation means and a reception level detection means, wherein a cycle T1 in which the phase control means causes the phase varying means to vary the phase amount repetitively and a communication packet length T3 satisfy a relationship of T3<T1, the demodulation means demodulates a plurality of packets which are transmitted and received repetitively, and packet data of the transmitted packet corresponding to a highest reception level detected by the reception level detection means, of the received transmitted packets, is obtained as the received data. In accordance with this, it becomes possible to detect the reception level is lowered in the reception of the packet transmitted firstly. And, when the packet re-transmitted (transmitted subsequently) is received, the packet transmitted firstly or the packet re-transmitted which is higher in the reception level, is selected. Thus, it becomes possible to receive the transmitted packet corresponding to the reception level which is not lowered, and avoid that an error occurs in the received data due to lowering of the reception level in a localized area.

A radio communication device according to a sixth aspect of the present invention, in the first aspect, further comprises a demodulation means, a reception level detection means and a received data re-configuring means, wherein a cycle T1 in which the phase control means causes the phase varying means to vary the phase amount repetitively, a cycle T2 of a transmission rate of communication data, and a communication packet length T3 satisfy a relationship of T2<T1<T3, the demodulation means demodulates a plurality of packets which are transmitted and received repetitively, and the received data re-configuring means selects partial data corresponding to a highest reception level detected by the reception level detection means, among the partial data of the transmitted packet which is demodulated by the demodulation means, and re-configures the transmitted packet data by connecting the partial data together. In accordance with this configuration, even when the reception level of a portion of the packet transmitted firstly is lowered in demodulation, the packet re-transmitted (transmitted subsequently) is received and portions corresponding to the reception level which is not lowered are connected together, thereby receiving data stream containing no error, and avoiding that the reception level is lowered in a localized area.

A radio communication device according to a seventh aspect of the present invention, in the first aspect, further comprises a reception level detection means, wherein the phase control means causes the phase varying means to vary the phase amount during a time length T4 from a timing at which reception of a transmitted packet starts, and a time length T5 of a bit synchronization signal which is at a head of the received transmitted packet satisfies a relationship of T4<T5, the phase control means causes the phase varying means to vary the phase amount cyclically or randomly, during the time length T4, the reception level detection means detects the reception level, and reception is performed after the time length T4 in a state in which the phase control means causes the phase varying means to fix the phase amount corresponding to the highest reception level detected. In accordance with this configuration, an optimal phase amount in the phase varying means can be ensured at a timing at which the head of the transmitted packet is received, and lowering of the reception level in the localized area can be avoided.

In a radio communication device according to an eighth aspect of the present invention, in the first aspect, the phase varying means varies the phase amount in response to a voltage input to a control signal input terminal of the phase varying means, and a voltage changing cyclically or randomly which is output from a control signal output terminal of the phase control means is input to the control signal input terminal. In accordance with this configuration, the phase varying means is able to vary the phase amount merely by changing the voltage. Therefore, a circuit configuration of the phase control means and a circuit configuration of the phase varying means can be simplified.

In the radio communication device according to a ninth aspect of the present invention, in the eighth aspect, the control signal of the phase control means has a square waveform, and the control signal having the square waveform is input to the control signal input terminal of the phase varying means via a filter. In accordance with this configuration, since the square waveform output from a terminal of a microcomputer, etc., can be used as the output of the phase control means, the circuit configuration of the phase control means can be further simplified.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

As described above, a radio communication device of the present invention is capable of avoiding that a reception level is lowered in a localized area due to fading under a multi-path propagation environment. The radio communication device is capable of performing stable communication because the reception level is not lowered significantly.

The invention claimed is:
1. A radio communication device comprising:
a first antenna;
a second antenna;
a phase varying means which varies a phase of a radio frequency (RF) signal received by or transmitted from the first antenna; and
a phase control means which causes the phase varying means to vary the phase of the RF signal received by or transmitted from the first antenna by a variable phase amount,
wherein the radio communication device is configured to receive packet data having the same content sequentially via the first antenna and the second antenna,
wherein the phase control means causes the phase varying means to vary the phase amount repetitively in fixed cycles, and
wherein when a cycle in which the phase control means causes the phase varying means to vary the variable phase amount repetitively is T1 and a time length of data transmitted and received in a state in which the data is incorporated in the RF signal is T3, the phase control means causes the phase varying means to vary the variable phase amount such that a relationship T1 greater than T3 is satisfied.

2. The radio communication device according to claim 1, further comprising:
   a synthesizing means which synthesizes the RF signal containing the packet data received by the first antenna and the RF signal containing the packet data received by the second antenna;
   a demodulation means which demodulates the RF signal synthesized by the synthesizing means to generate the packet data; and
   an error detection means which detects whether or not the packet data generated by the demodulation means contains an error, and
   wherein when the error detection means detects that the packet data contains an error, the packet data containing the error is discarded and the error detection means detects whether or not packet data generated by the demodulation means subsequently to the packet data containing the error contains an error.

3. The radio communication device according to claim 1, further comprising:
   a synthesizing means which synthesizes the RF signal containing the packet data received by the first antenna and the RF signal containing the packet data received by the second antenna;
   a demodulation means which demodulates the RF signal synthesized by the synthesizing means to sequentially generate the packet data; and
   a reception level detection means which detects a reception level indicated by an electric power intensity of the synthesized RF signal, in reception of the packet data generated by the demodulation means,
   wherein packet data corresponding to a highest reception level detected by the reception level detection means is selected as received data.

4. The radio communication device according to claim 1, wherein the phase varying means is configured to vary the variable phase amount in response to a voltage input to a control signal input terminal of the phase varying means; and wherein a voltage changing cyclically or randomly which is output from a control signal output terminal of the phase control means is input to the control signal input terminal.

5. The radio communication device according to claim 4, wherein a control signal of the phase control means has a square waveform; and wherein the control signal having the square waveform is input to the control signal input terminal of the phase varying means via a filter.

6. The radio communication device according to claim 1, wherein each of the first antenna and the second antenna extends in one direction, and the first antenna and the second antenna are arranged such that the extending direction of the first antenna and the extending direction of the second antenna are orthogonal to each other.

* * * * *